US008665216B2

(12) United States Patent
Karasin et al.

(10) Patent No.: US 8,665,216 B2
(45) Date of Patent: Mar. 4, 2014

(54) SYSTEM AND METHOD OF TACTILE ACCESS AND NAVIGATION FOR THE VISUALLY IMPAIRED WITHIN A COMPUTER SYSTEM

(75) Inventors: Igor Karasin, Jerusalem (IL); Yula Wohl, Mevasseret Zion (IL)

(73) Assignee: Tactile World Ltd., Mevasseret Zion (IL)

( * ) Notice: Subject to any disclaimer, the term of this patent is extended or adjusted under 35 U.S.C. 154(b) by 606 days.

(21) Appl. No.: 12/327,165

(22) Filed: Dec. 3, 2008

(65) Prior Publication Data

US 2010/0134416 A1 Jun. 3, 2010

(51) Int. Cl.
*G06F 3/041* (2006.01)

(52) U.S. Cl.
USPC .............................. 345/163; 345/156; 345/184

(58) Field of Classification Search
USPC .............................. 345/56, 163, 169, 173, 184
See application file for complete search history.

(56) References Cited

U.S. PATENT DOCUMENTS

| 5,461,399 | A  | * | 10/1995 | Cragun ........................ 715/729 |
| 5,912,660 | A  | * | 6/1999  | Gouzman et al. ............. 345/163 |
| 6,278,441 | B1 | * | 8/2001  | Gouzman et al. ............. 345/163 |
| 6,762,749 | B1 | * | 7/2004  | Gouzman et al. ............. 345/163 |
| 7,106,220 | B2 |   | 9/2006  | Gourgey et al. |
| 7,986,303 | B2 | * | 7/2011  | Braun et al. .................. 345/163 |
| 2003/0071859 | A1 |   | 4/2003 | Takami et al. |
| 2003/0117371 | A1 | * | 6/2003 | Roberts et al. ................ 345/156 |
| 2005/0233287 | A1 |   | 10/2005 | Bulatov et al. |
| 2008/0024459 | A1 |   | 1/2008 | Poupyrev et al. |
| 2008/0068343 | A1 | * | 3/2008 | Hoshino et al. ............... 345/173 |

OTHER PUBLICATIONS

International Search Report and the Written Opinion of the International Searching Authority in PCT/IL 09/01050 mailed Mar. 24, 2010.
"Screen reader", Wikipedia [Online], 4 pages.

* cited by examiner

*Primary Examiner* — Christopher E Leiby
(74) *Attorney, Agent, or Firm* — Nixon & Vanderhye PC

(57) ABSTRACT

A tactile access and navigation system and method for a visually impaired user operating within a computerized data environment includes a bi-directional input-output system having one or more tactile displays and user-operable input controls; a data transformer for extracting display data from the computer and transforming that data into a form suitable for display by the one or more tactile displays; apparatus for arranging the display data into a predetermined structure of GUI elements for navigation by the bi-directional input-output system; and apparatus for providing display data to the one or more tactile displays in any of one or more viewing modes for displaying on the one or more tactile displays a tactile representation of graphical and textual data content; and one or more navigational modes for displaying on the one or more tactile displays a tactile representation of the orientation of the GUI elements within the structure.

11 Claims, 21 Drawing Sheets

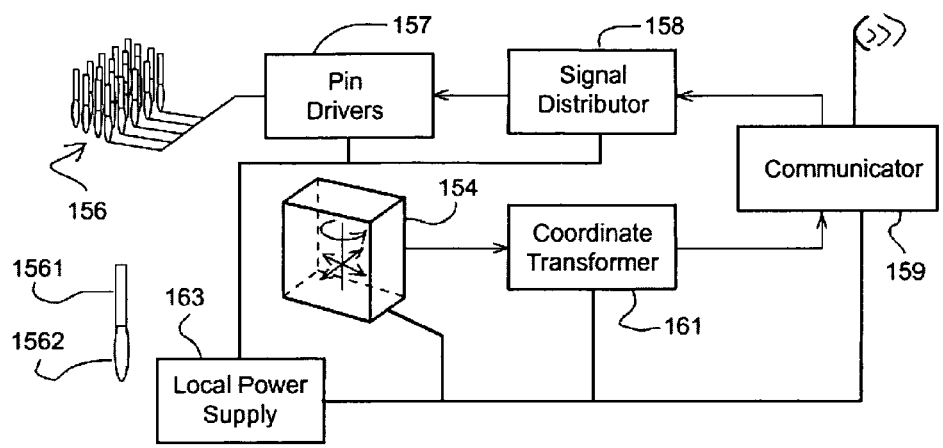
Fig. 5B
Fig. 6A
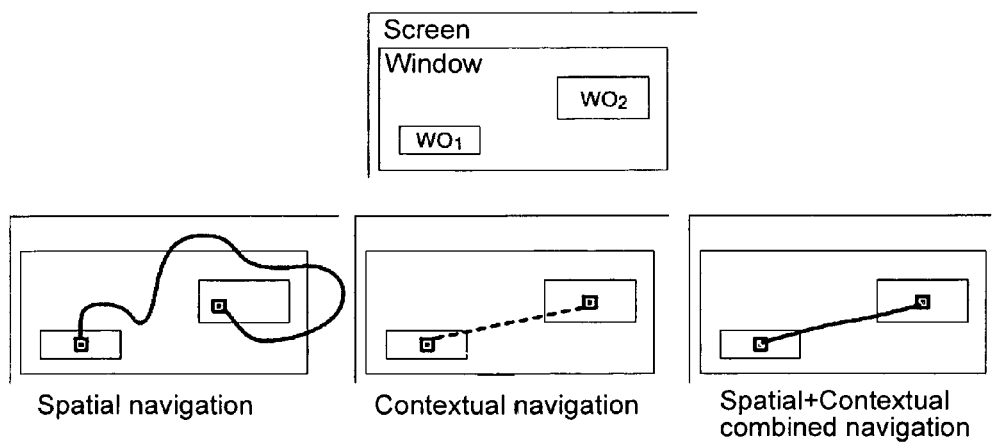
Spatial navigation
Fig. 6B
Contextual navigation
Fig. 6C
Spatial+Contextual combined navigation
Fig. 6D

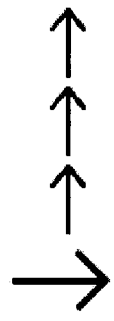

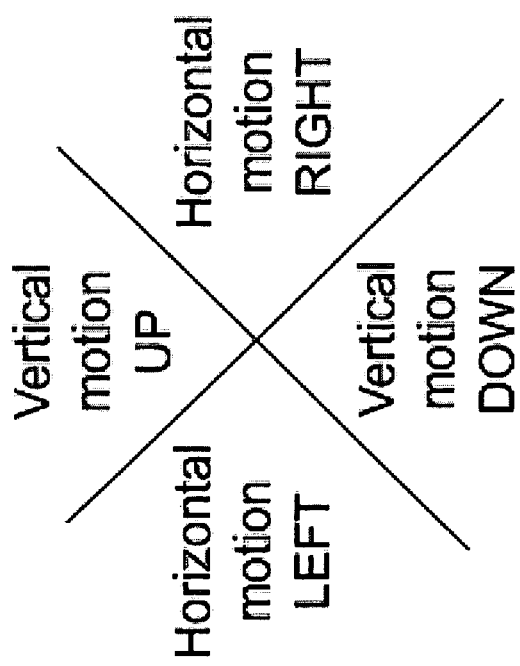
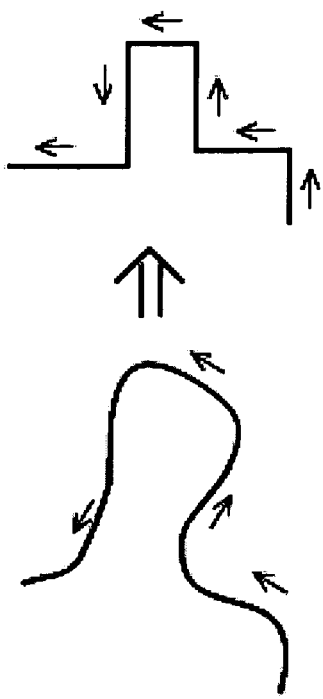
Fig. 16C
Fig. 16B
Fig. 16A

SYSTEM AND METHOD OF TACTILE ACCESS AND NAVIGATION FOR THE VISUALLY IMPAIRED WITHIN A COMPUTER SYSTEM

FILED OF THE INVENTION

The present invention is directed to providing a tactile computer system for the visually impaired. In particular the present invention relates to tactile accessibility and navigation systems suitable for use by visually impaired users.

DEFINITION

In the present application the term 'GUI Element' (GE) is used to refer to textual and graphic elements displayed during the course of use of a computer, including, but not limited to windows, child windows, window elements, icons, pointers, scrolling controls, splitting controls, scroll bar controls, split bar controls, menus, menu elements, menu commands, menu items, dialog box elements, command buttons, dialog box controls, check boxes, option buttons, radio buttons, push buttons, buttons for pull down menus, sliders, value sets, edit controls, text boxes, list boxes, combo boxes, linked text, list boxes, spin boxes, toolbars and rulers, sizing handles, text frames, toolboxes, multimedia controls, message boxes, status bars, progress indicators, gauges, captions and the like, The term 'display data' refers herein to all data to be provided to a user as by way of GUI elements conventionally displayed on a visual display unit (VDU) and functional, textual or audio descriptors associated therewith. Additionally, display data may include an array of information relating to the color and shade of a set or area of pixels. Alternatively, display data may include encoded information such as an ASCII or Unicode character code.

BACKGROUND OF THE INVENTION

Users of computers need to navigate within data rich environments in order to access relevant information.

Referring now to FIG. 1, there is shown a PRIOR ART personal computer system (PCS) which includes a software system 11, at least one output device 12 and at least one input device 14.

The software system 11 includes an information extractor 111 which is configured to obtain data from an information source 10. Extracted data is processed by an output generator 112 and sent to the output devices, shown in block 12. The output devices typically provide a visual representation of the data to a user 13 via a visual display unit (VDU) 122. Supplementary output may be provided by an audio output device 121, such as a speaker. Input devices 14, which may be keyboards, computer mice, touch pads, joysticks and the like, are devices configured to allow the user 13 to provide feedback 13 to the software system 11.

A sighted user will typically navigate using the PCS system by observing the visual information provided by the VDU 122 and providing feedback 113 for selecting pertinent data. For example, a cursor may be indicated upon the VDU, the position of the cursor may be adjusted by a user manipulating a keyboard, mouse or other input device 14, which may then be used to select a desirable portion of the information displayed.

A visually impaired user is not able to use the visual indications provided by the PCS, and there is thus a need to facilitate access and navigation by non-visual means.

It will be appreciated that the above-described prior art PCS (FIG. 1) which is dependent solely upon visual output devices 122, is not appropriate for use by a visually impaired user.

Referring now to FIG. 2, there is shown a block diagram representing the main components of a further, enhanced PRIOR ART PCS similar to that of FIG. 1, but also including accessibility and navigation aids for the visually impaired.

The enhanced PCS includes a number of elements not included in the PCS shown and described above in conjunction with FIG. 1, specifically a Refreshable Braille Display (RBD) 123, whose main function is the tactile display of Braille symbols. RBD 123 may further include command controls for moving the text line up and down and for controlling the position along the line and as such also functions as an input device.

In the system shown in FIG. 2, software system 11 is seen to include some additional elements, including a screen reader 114 and a generator of accessible information (GAI) 115, which are used to render the visual data presentation into a form that may be presented to a blind user via speakers 121 and/or by RBD 123.

The screen reader 114 is configured to extract and analyze all information presented in the VDU 122, including graphic and textual information, as well as information regarding GUI elements. The screen reader 114 is further adapted to receive user feedback 116 from the input units including those associated with RBD 123. The GAI 115 processes the data from the screen reader 114 and outputs the data to the user using VDU 122, speakers 121 and RBD 123.

FIGS. 3A and 3B represent the feedback of data for the prior art PCS systems of FIGS. 1 and 2, respectively. With particular reference to FIGS. 1 and 3A, data obtained by the information extractor 111 from the information source is transferred to the output generator 112, from where it is provided to VDU 122 for presentation to the user 13. The user 13 provides feedback to the information extractor 111 using input devices 14 such as a keyboard or a mouse. In response to user feedback, the information extractor 111 may obtain further information from the source.

FIG. 3B shows the corresponding feedback cycle associated with the PCS system of FIG. 2, thus requiring an additional feedback loop, as shown. The visual display 122 is analyzed by the screen reader 114 which provides data to RBD 123 via the output generator 112, as well as to VDU 122. The user 13, upon receiving information from RBD 123 may provide feedback, via input devices 14, to either the information extractor 111 or to the screen reader 114.

The enhanced PCS allows a visually impaired user to navigate between GUI Elements (GEs) by providing access both to visual (name, caption, etc) and to non-visual (function, location, subordination, etc) descriptors. Such navigation is contextual in nature, meaning that the user navigates by referring to the context of the object under consideration without reference to its geometrical and spatial parameters (location, dimensions, overlapping, etc). Such navigation is referred to hereafter as Contextual Navigation (CN). It will be appreciated that contextual navigation is more limited than navigation used by sighted people which typically combines Contextual Navigating methods with Spatial Navigating methods.

The term Spatial Navigation refers to navigation using spatial indications such as the location of a target GUI element and the location of a mouse cursor which may be aligned by the user in order to select the target GUI. A sighted user will generally align a cursor to a GUI element by moving in a substantially straight line whilst correcting for deviations from that line along the way.

Tactile text output may incorporate elements of spatial navigation particularly for a user reading large amounts of text with an RBD. For example, a user may shift to the next symbol, search for the beginning of the current word, jump to the previous line and so on. However, prior art systems do not lend themselves to spatial navigation techniques requiring graphic perception; navigational actions such as following a line or a curve, moving to a top-left corner of a window, screen or dialog box, dragging and dropping and the like. While these techniques are employed very effectively by sighted people with the aid of a mouse, they are completely unavailable to the blind.

A visually impaired user typically uses a tactile output device such as an RBD to receive contextual information, and uses inputs such as the keyboard to provide feedback. This can be difficult to use as well as inefficient because of the necessity to learn hundreds of individual keyboard commands, and, because a visually impaired user has no access to visual guidance, even a skilled user learns to navigate successfully by using a process of trial and error, which may be very tiresome and discouraging. This is exacerbated in a system involving the use of an RBD, as the user's hands need to move repeatedly between the RBD and the keyboard and back, sometimes crossing over in the process.

Also known in the art is U.S. Pat. No. 5,912,660, entitled Mouse-Like Input/Output Device with Display Screen and Method for Its Use, the contents of which are incorporated herein by reference.

BRIEF SUMMARY

The present exemplary embodiment seeks to impart to the visually impaired user a tactile computer system and method of use thereof which overcome problems of known art, and render accessible to the visually impaired programs and data which are accessible almost exclusively to the sighted user.

There is thus provided, in accordance with a preferred embodiment of the invention, a tactile access and navigation system for a visually impaired user operating within a computerized data environment, the system including:

a bi-directional input-output system having one or more tactile displays and one or more user-operable input controls;

a data transformer in communication with the one or more tactile displays, operative to extract display data from the computer, and to transform extracted display data into a form suitable for display by the one or more tactile displays;

apparatus for arranging the display data into a predetermined structure of GUI elements, the structure being navigable by the bi-directional input-output system; and apparatus for providing display data to the one or more tactile displays in accordance with predetermined modes of operation, which include:

one or more viewing modes for displaying on the one or more tactile displays a tactile representation of graphical and textual data content; and one or more navigational modes for displaying on the one or more tactile displays a tactile representation of the orientation of the GUI elements within the structure.

Additionally in accordance with a preferred embodiment, the input-output system resides in a unitary tactile mouse having one or more tactile displays and one or more input controls.

Further in accordance with a preferred embodiment, the navigational mode is selected from the group including:

spatial navigation modes;
a contextual navigation mode; and
a spatial-contextual navigation mode.

In accordance with a further embodiment of the invention, there is provided a method for employing a tactile mouse having one or more tactile displays and one or more command input controls for navigating among GUI elements represented in display data extracted from a computer, the method including the steps of:

(a) extracting display data from the computer screen;
(b) identifying the GUI elements among the extracted display data;
(e) organizing the GUI elements into a logical structure;
(d) displaying in tactile form upon a tactile display descriptors relating to a first GUI element;
(e) sensing input from the tactile mouse, the input including the spatial motion of the tactile mouse, and the input of commands via the one or more input controls;
(f) in response to the input from the tactile mouse, selecting a second GUI element from the structure; and
(g) indicating the selected second GUI element to the user.

Additionally in accordance with the present embodiment, step (g) of indicating the selected second GUI element to the user includes constructing a tactile guide between the first GUI element and the second GUI element, indicating the direct route to be taken by the tactile mouse from the first GUI element to the second GUI element.

Further in accordance with the present embodiment, step (g) of indicating the selected second GUI element to the user includes displaying in tactile form upon the tactile display descriptors relating to the second GUI element.

Additionally in accordance with the present embodiment, step (c) includes the step of organizing the GUI elements into a hierarchical structure.

Further in accordance with the present embodiment, at least a selection of the GUI elements is grouped into one or more sets wherein step (f) of selecting a second GUI element includes constructing a virtual table having a top row, a bottom row, and a middle row therebetween, wherein the middle row contains a plurality of GUI elements including the first selected GUI element, the top row contains the parent of the first selected GUI element, and the bottom row contains all the children of the first selected GUI element;

and wherein each of the GUI elements from the top, middle and bottom rows are selectable as the second GUI element.

Additionally in accordance with the present embodiment, each of the sets of GUI elements contains all the siblings of the first selected GUI element.

In accordance with an additional embodiment, each of the sets of GUI elements contains GUI elements having the same context as the first selected GUI element and on the same hierarchical level thereas.

Alternatively, at least a selection of the GUI elements is grouped into one or more sets wherein step (f) of selecting a second GUI element includes constructing a virtual table having a top row, a bottom row, and a middle row therebetween, wherein the middle row contains GUI elements having the same context as the first selected GUI element in the hierarchy structure independently of the respective hierarchical levels of the GUI elements in the middle row, wherein the top row contains the same number GUI elements as the middle row and each of them is the parent of a corresponding GUI element in the middle row, and the bottom row contains all the children of the first selected GUI element, and wherein each of the GUI elements from the top, middle and bottom rows is selectable as the second GUI element.

BRIEF DESCRIPTION OF THE FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings:

FIG. 5B is a block diagram showing the main elements of a driving mechanism for the tactile display of FIG. 5A, in accordance with a preferred embodiment of the invention;

FIGS. 6A-D are schematic diagrams of a segment of a screen showing alternative paths followed between two GUI elements illustrating various navigational modes;

FIGS. 8A-8C2 show exemplary configurations of extracted screen areas corresponding to different configurations of tactile displays for use with the embodiments of the invention;

FIGS. 15A-15D show a selection of virtual tables constructed for data elements of the hierarchical structure of FIG. 14 according to still another embodiment of the invention;

FIGS. 16A-16C represent a possible set of effects associated with shifting a tactile mouse in various directions according to a further embodiment of the invention;

DETAILED DESCRIPTION OF THE PREFERRED EMBODIMENTS

Figure 4A:
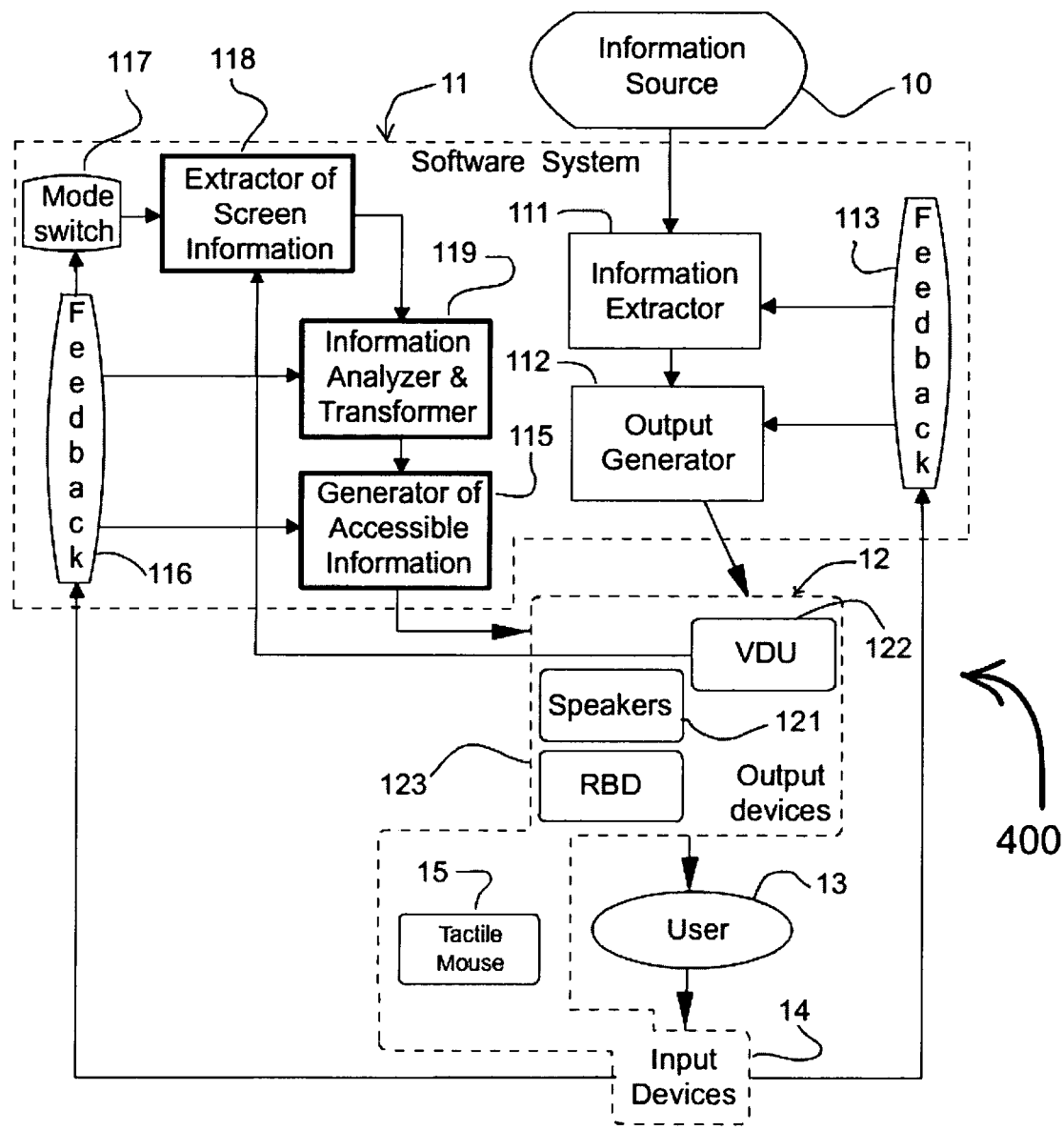
FIG. 4A is a block diagram showing the main elements of a tactile computer system (TCS) according to one embodiment of the present invention.

Referring now to FIG. 4A, there is shown a block diagram of a tactile computer system (TCS), referenced generally 400, the TCS 400 is constructed and operative in accordance with a preferred embodiment of the invention. The TCS 400 of embodiments of the invention includes a number of prior art elements, shown and described above in conjunction with FIGS. 1-3B, which are denoted herein by the same reference numerals, and which are not specifically described hereinbelow, except as may be necessary.

TCS 400 further includes a bi-directional tactile input/output device 15, referred to generally herein as "tactile mouse" 15. For example, a tactile mouse 15 may be manufactured in accordance with U.S. Pat. No. 5,912,660 entitled Mouse-Like Input/Output Device with Display Screen and Method for Its Use, the contents of which are incorporated herein by reference. It will be appreciated by persons skilled in the art, that tactile mouse 15, while being a single device, in fact embodies input means and output means which together form a bi-directional tactile input/output system, the functions of which could be provided by separate input and output devices.

TCS 400 also includes software elements among which are a mode switch 117, extractor of screen information (ESI) 118, an information analyzer & transformer 119 and a GAI 115. In preferred embodiments of the invention, multiple ESIs and GAIs may be configured to operate in combination. All the additional software elements (namely, those not shown previously in FIG. 2) are controlled by user via another feedback module 116.

The mode switch 117 is used to select between operational modes of the system, namely, graphic mode with spatial navigation, text mode with spatial navigation, contextual navigation mode, and combined spatial and contextual navigation mode. Optionally, the mode switch 117 may be controlled by a switch on the tactile mouse. Alternatively, according to the present embodiment of the invention, the mode switch 117 may switch modes both automatically (between graphic and text modes) and by user via feedback block 116.

Figure 2:
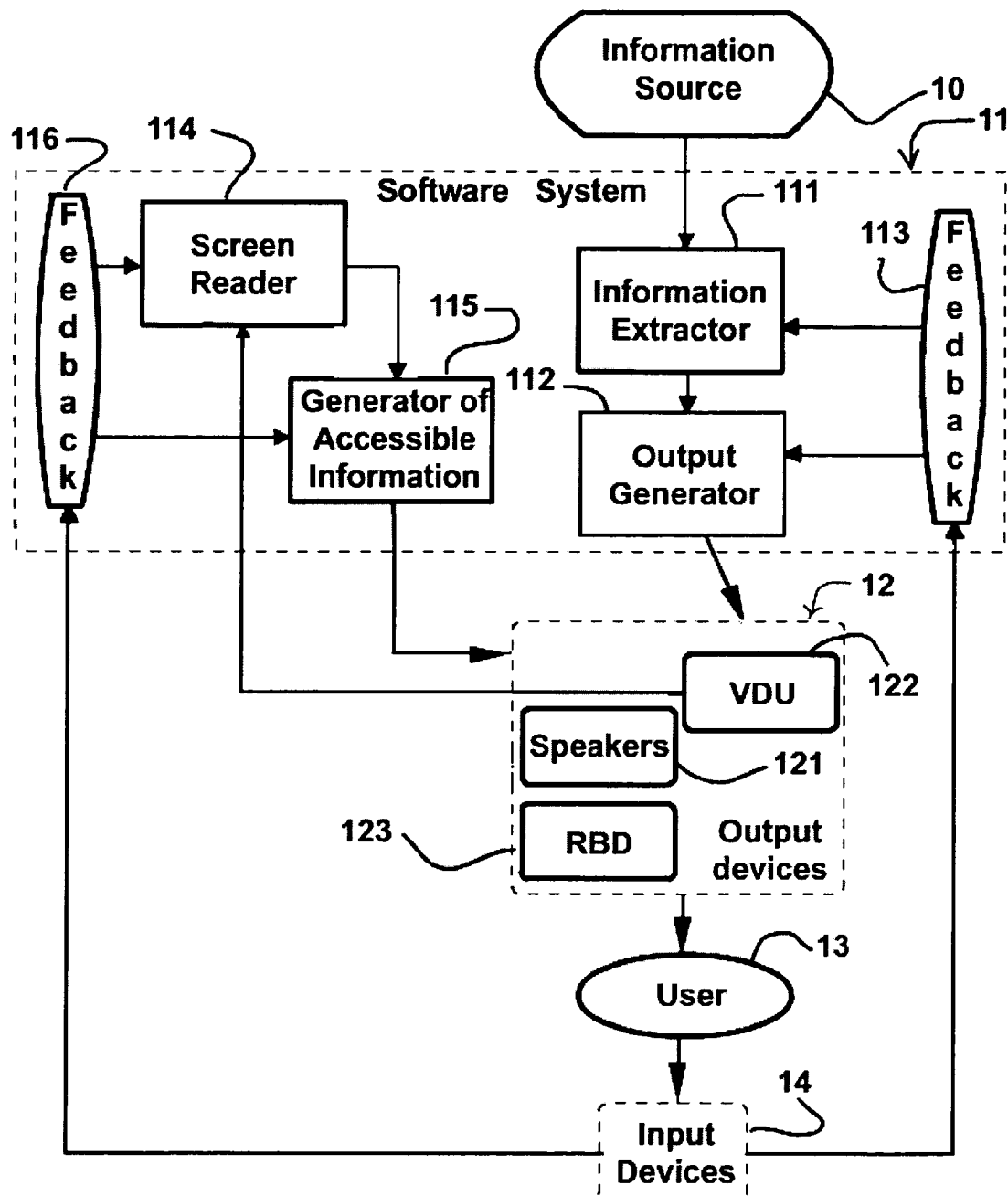
FIG. 2 is a block diagram of a PRIOR ART personal computer system similar to that of FIG. 1, but also including accessibility and navigation aids for the visually impaired.
Figure 3B:
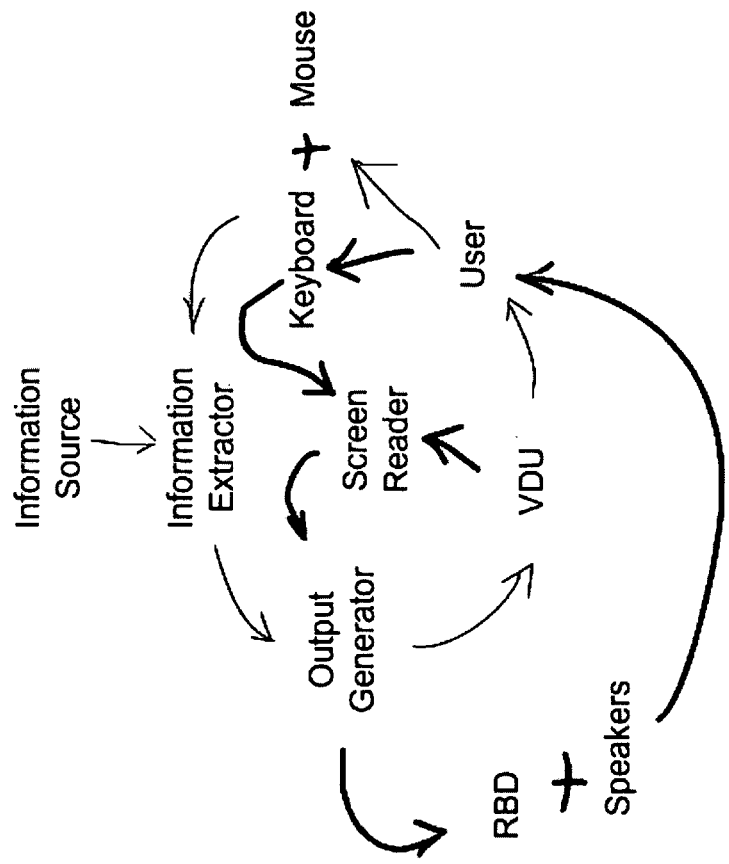
FIGS. 3A and 3B are schematic diagrams showing the feedback cycles associated with the prior art systems of FIG. 1 and FIG. 2 respectively.
Figure 3A:
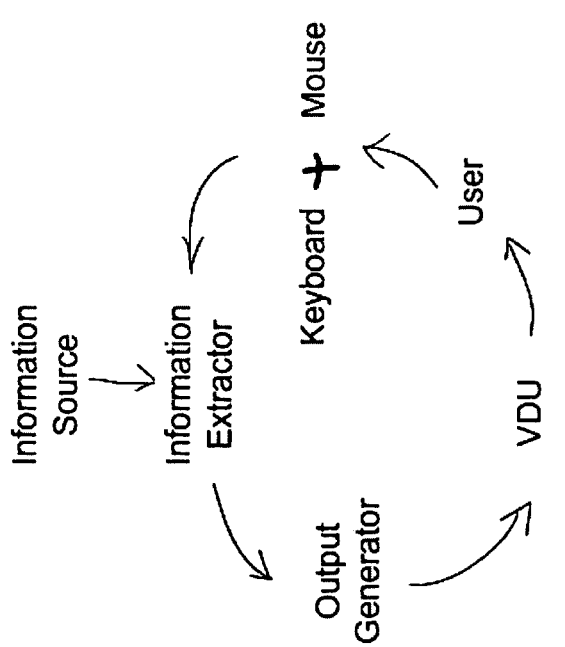

The ESI 118 is an expanded version of the prior art Screen Reader 114 (FIG. 2). Depending on the selected operation mode the ESI 118 extracts display data normally used to construct a visual display on a visual display unit (VDU) 122. Among such data are types of visual data, including graphics, text and the like as well as descriptors for GUI elements.

The information analyzer & transformer 119 analyzes the features of the information extracted by the ESI 118 and converts the information into a form required by the user for each mode of operation that may be selected.

The GAI 115 supplements the types of output provided by the prior art generator 112 (FIG. 2), and is adapted to provide, inter alia, tactile output via a tactile mouse 15.

In accordance with a preferred embodiment of the invention, a tactile mouse 15 is used both as a tactile output device, and also as a tactile input device for the user to input feedback to the following system portions: ESI 118 (FIG. 4A), information analyzer & transformer 119 (FIG. 4A), generator of output information 112 (FIG. 4A), and GAI 115 (FIG. 4A).

Figure 4B:
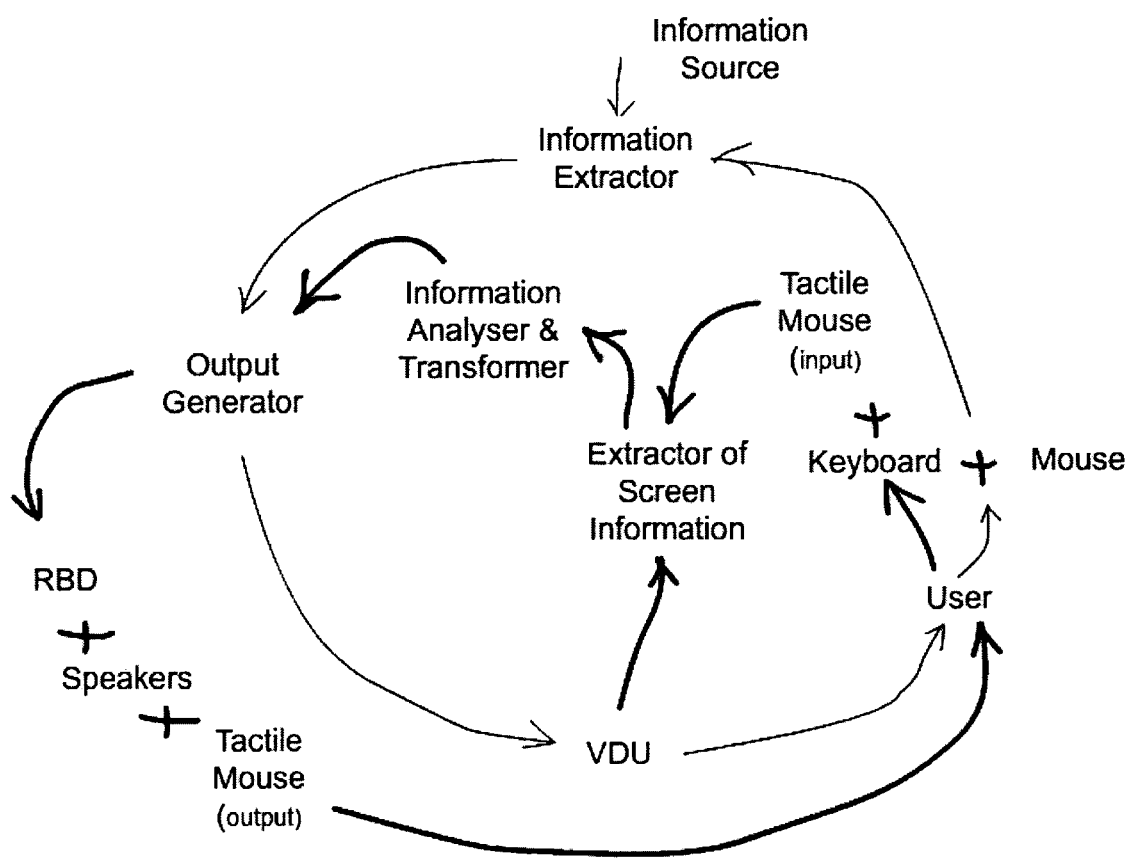
FIG. 4B is a schematic diagram representing the feedback cycle associated with the TCS of FIG. 4A.

Referring now also to FIG. 4B, shown therein is the data feedback loop associated with TCS 400. By comparing the data feedback loop shown in FIG. 4B with the feedback cycle shown in FIG. 3B, associated with the prior art PCS system shown in FIG. 2B, it will be noted that there is additional feedback is provided to the user from the tactile mouse itself.

Brief descriptions of embodiments of key components of the TCS 400 are given below.

Bi-Directional Tactile Input/Output System

Figure 5A:
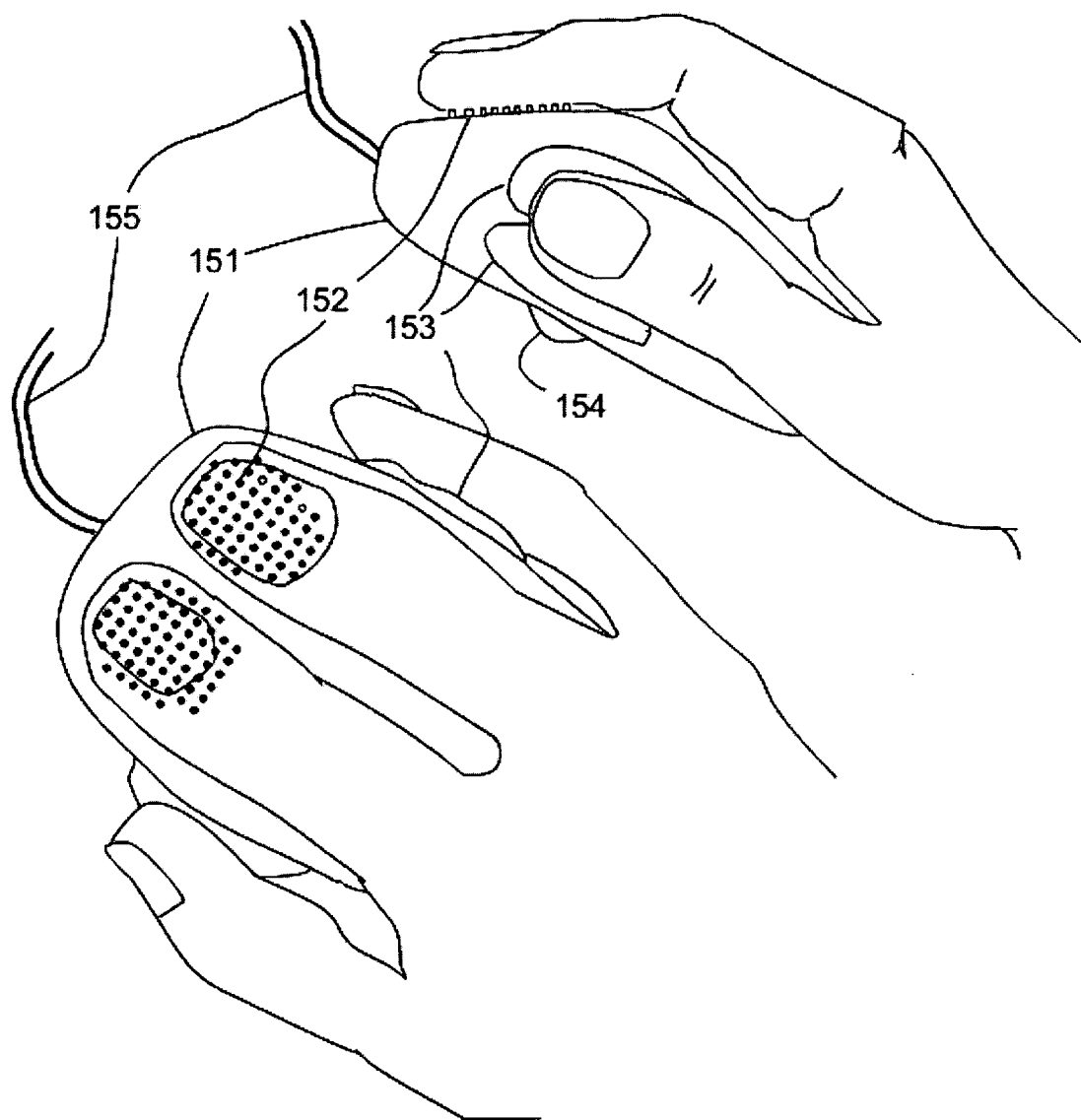
FIG. 5A is a schematic representation of a tactile, integrated, bi-directional communication device for use with the TCS according to an exemplary embodiment of the invention.

Referring now to FIG. 5A, a tactile mouse 15 is a bi-directional communication device providing a tactile output to the user via tactile displays 152, in addition to input controls via push buttons 153 used as a command entering mechanism, which may be pressed, released, clicked, double-clicked, or otherwise used to provide feedback to the computer; and a mechanism 154 such as a roller-ball, optical sensor, or the like for sensing the position of the tactile mouse relative to its previous position.

It will be appreciated that while use of tactile mouse 15 is most convenient, embodying both data output and input in a single device, its functions may also be provided separately, for example, by provision of tactile displays 152, and input buttons/switches 153, respectively, on separate devices which cumulatively combine to provide the necessary functions input/output functions required in accordance with the present invention.

The position sensors 154 are provided to measure the variation of at least two spatial coordinates. The position of tactile mouse 15 is transmitted to the computer, typically via a connecting cable 155, such that each shift of the tactile mouse 15 on a work surface corresponds to a shift of the cursor of tactile mouse 15 on the visual display of the computer. These features allow the tactile mouse 15 to send input data to the computer in the same way as a conventional computer regular mouse.

As stated above, in addition to the input mechanism, a tactile mouse 15 has one or more tactile output displays 152 for outputting data from the computer to the user. As described in greater detail hereinbelow in conjunction with FIGS. 8A-8C2, each tactile display is typically a flat surface (although the surface may be curved) having a plurality of pins 156 which may rise or otherwise be embossed in response to output signals from the computer. In certain embodiments, the tactile mouse 15 has a rectangular array of mechanical pins with piezoelectric actuators. The pins may be arranged with a density of say 1.5 mm distance between neighboring pins. Other pin configurations or other types of embossed display will occur to the skilled practitioner.

One embodiment of a driving mechanism for the tactile display 152 of the tactile mouse 15 is represented by the block diagram of FIG. 5B. The main elements of the driving mechanism are an array of pins 156, a pin driver 157, a signal distributor 158, a communicator 159, a coordinate transformer 161, a position sensing mechanism 162 and a local power supply 163 powering all electronic mechanisms of the tactile mouse, including the tactile display 152.

As the tactile mouse 15 moves over a surface, the sensing mechanism 154 is operative to track the movements thereof. The movements of the mouse 15 are transformed into a set of coordinates by the coordinate transformer 161 which relays the current coordinates of the mouse to a computer via a communicator 159. The communicator 159 is further operative to receive an input signal from the computer relating to the display data extracted from the region around the tactile mouse cursor. The input signal from the computer is relayed to the signal distributor 158 which sends driving signals to the pin drivers 157. Each pin driver 157 typically drives a single pin 156 by applying an excitation signal to an actuator 1562 such as a piezoelectric crystal, plate or the like configured to raise and lower a pin 1561.

The tactile mouse 15 may be connected to the computer via standard communication channels such as serial/parallel/USB connectors, Bluetooth, wireless communication or the like. The operational interface between the tactile mouse 15 and the computer system has an input channel for carrying data from the tactile mouse 15 to the computer and an output channel for carrying data from the computer to the tactile mouse 15.

Regarding the input channel, when the position sensor 154 of the tactile mouse 15 is moved along a flat working surface, the sensors measure relative displacement along at least two coordinate axes. These coordinates are converted by embedded software, into signals which are organized according to an exchange protocol and sent to the computer. Upon receiving these signals, the operation system decodes and transforms them to coordinates of the tactile mouse cursor on the computer screen. Thus, the motion of the tactile mouse cursor over the screen corresponds to the motion of the tactile mouse 15 over its working surface. The exchange protocol also includes coded signals from the tactile mouse 15 indicating actions associated with each of the input buttons such as a press signal, a release signal, a double click signal and the like.

Regarding the output channel, the output signal sent from the computer to the tactile mouse 15 depends upon the coordinates of the tactile mouse cursor, the visual contents displayed at within a predetermined range of those coordinates upon the screen and the active operation mode (see below). Accordingly, the tactile display of the tactile mouse 15 may output a text symbol, graphical element, picture, animation, or the like. Like the regular system cursor, the tactile mouse cursor determines its own hotspot.

Referring back to FIG. 4A, tactile mouse 15 is of particular utility for visually impaired users as it makes the information stored in a computer far more accessible to them. There are a number of reasons for this increased accessibility, notably:

The tactile mouse 15 can be effectively used for navigation among a large amount of information presented on VDU 122.

The movable nature of the tactile mouse 15 allows large amounts of contextual, graphical, and textual information to be displayed to the user by tactile mouse displays 152.

Braille and other symbols are displayed to the user in embossed form, providing an additional tactile channel for the presentation of text.

Graphic objects may also be represented displayed in embossed form, e.g., a black pixel may be displayed as a raised pin and a white pixel as a lowered pin. Similarly, a gray pixel may be displayed as a pin raised in an intermediate height or transformed to black or white depending on a certain threshold. Similar operations can be done with pixels of all other colors.

The use of a tactile mouse 15 in a similar manner to the mouse of a sighted user may be a strong psychological motivator for a visually impaired user to access the computer information.

It will thus be appreciated that a significant advantage of TCS 400 is that visually impaired users are provided with access to graphical information in tactile form. Unlike prior art RBDs 123 (FIG. 2), which offer only a single method for tactile reading, a user may select from between a variety of text reading modes and their modifications. Furthermore, the movable tactile mouse 15 facilitates spatial and contextual navigation modes for graphical, textual and GUI element environments in a manner very similar to that used by sighted people.

The Mode Switch

A particular feature of the improved TCS 400 (FIG. 4A) is that using the integrated tactile mouse 15, the user 13 is able to select between multiple operational modes. The mode switch 117 is used to select either a viewing mode or a navigational mode. Viewing modes, such as graphic mode or text mode, render visual information from the VDU 122 into tactile or audio form. Navigational modes, such as spatial mode or contextual mode provide the user with tactile indications and guides to assist in navigating between GUI elements, links, and the like.

According to one embodiment of the invention, when in graphic mode, the ESI 118 extracts display data such as color component data of a bitmap image from a predetermined area in the vicinity of the cursor of tactile mouse 15. This data is sent to the Information Analyzer & Transformer 119 where a Graphics Transformer 1191 (FIG. 9), described further below, converts the display data into binary or simplified color data such as a bitmap file to be sent to at least one of the tactile displays 152 of tactile mouse 15, as described above.

In another embodiment, text mode may be used to render textual data into tactile form for presentation via tactile display 152 In text mode, the ESI 118 extracts text from a predetermined area around the tactile mouse cursor as a sequence of ASCII or Unicode symbols. This data is sent to the Information Analyzer & Transformer 119 where it is converted into a tactile form desired by the user 13, the tactile form may be among others Braille, printed symbols or the like. These textual representations are then sent to the tactile mouse 15 for tactile display.

In preferred embodiments of the invention, the TCS 400, having both graphic and text modes, further provides spatial navigational capabilities, for example via motions which may be a smooth or direct motion of the cursor of the tactile mouse 15, or by a 'jumping' cursor motion within a desktop or a window, or between different GUI elements. For example, the tactile mouse 15 may be configured to move the cursor down a single pixel, to jump to the top-right corner of a window, to follow a line or a curve, to scan an area, or the like.

Reference is now made to FIGS. 6A-D showing a segment of a screen containing a window within which are two GUI elements, $WO_1$ and $WO_2$. FIGS. 6B-D illustrate three navigational nodes, namely, spatial navigation, contextual navigation, and combined spatial and contextual ('combined') navigation, respectively, showing various paths followed by a user traversing the screen from $WO_1$ to $WO_2$ using each of the above-mentioned modes.

The Spatial Navigation Mode (SNM) is a system operation mode typically employed by a user attempting to use the tactile mouse 15 in order to find a GUI element (via tactile or audio display) on the screen. To better understand the nature of SNM. FIG. 6B shows a path which may be taken by a visually impaired user scanning the screen from $WO_1$ to find $WO_2$ using the tactile mouse 15 in spatial mode. As seen, the path has no particular predetermined direction, and is simply an approximation of an unskilled user in attempting to find $WO_2$ which, as seen is eventually successful. This mode in and of itself, is not a particularly efficient or convenient mode for a visually impaired user in many cases.

In contrast to SNM, Contextual Navigation Mode (CNM) is a different system operation mode wherein the user moves the tactile mouse 15 in order to find a particular GUI element on the screen based upon contextual descriptors of the target object. In CNM, the movement of the tactile mouse cursor is not directly proportional or spatially correlated to the movement of the tactile mouse 15. Rather, the computer responds to key movements of the tactile mouse 15 by causing the tactile mouse cursor to jump to a predetermined location in response to a predetermined control or command input by the user. A typical CNM maneuver is illustrated in FIG. 6C where the dashed line illustrates a predetermined jump of the tactile mouse cursor from $WO_1$ to $WO_2$ which, in this mode, may, for example, be initiated by the user making a predetermined horizontal shift of the tactile mouse 15.

A further navigational mode Spatial-Contextual Navigational Mode (SCNM), as its name suggests, combines features of both spatial and contextual navigation. In SCNM, an additional feature, namely, a virtual guide trajectory is created in the computer memory which can be displayed use on the tactile display so that the user may travel from $WO_1$ to $WO_2$. The user may choose to follow the guide by moving the tactile mouse 15 along the trajectory, although he is also permitted to stray therefrom in order to locate other features on the screen. Such a method is useful for giving a visually impaired user a geometrical/spatial organization of the computer screen and simulating the experience of a sighted user navigating with a computer mouse.

It is noted that the principle default mode of the TCS 400 of the present invention is CNM.

Switching between the modes may be either manual or automatic. For example, a user may initiate the mode switch 117 to select a required mode by providing a command perhaps pressing some combination of keyboard keys, mouse buttons, or both. Alternatively, the mode may be triggered to change automatically, for example, when the tactile mouse cursor is over a picture the graphic mode is automatically selected and when the tactile mouse cursor moves over a region containing text, the text mode may be automatically selected. Optionally, the switching of the mode may be accompanied by a non-visual indication such as an audio signal. Alternatively, automatic mode switching may be seamless, namely without any non-visual indication that this has happened.

Extractor of Screen Information

Figure 7:
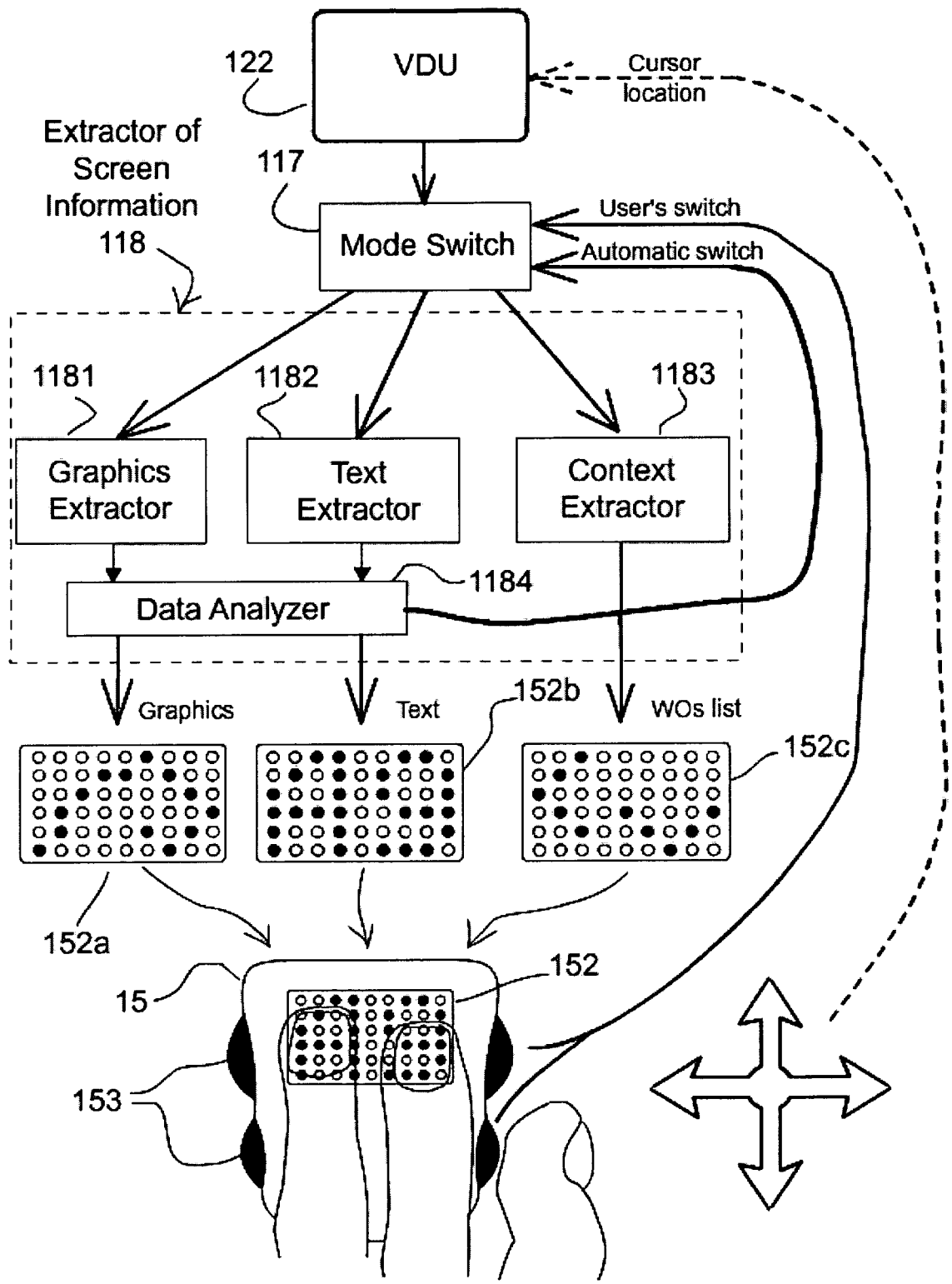
FIG. 7 is a block diagram representation of the extractor of screen information according to another embodiment of the invention.

Referring now to FIG. 7 a schematic representation is shown of the ESI 118 extracting visual information from VDU 122 (FIG. 7). The visual information may be rendered into tactile form in a number of ways as represented by the three tactile displays 152a, 152b, 152c, showing alternative tactile outputs produced from the same VDU in graphics mode as a fragment of a curve 152a, in text mode as the figures A and 9 and in contextual navigation mode as two arrows pointing left and down 152c.

The ESI 118 includes a graphics extractor 1181, a text extractor 1182, and a context extractor 1183. Depending upon the selected operational mode, the mode switch 117 selects which extractor to activate.

The graphics extractor 1181 is activated when the mode switch 117 selects the graphics mode. Typically, the graphics extractor 1181 extracts the display data associated with pixels surrounding a 'hotspot' location, namely, the location of the tactile mouse cursor. Display data is further transferred to the Information Analyzer & Transformer 119 (FIG. 4A, FIG. 9) for processing.

The display data comprises an array of information relating to the color and shade of each pixel within a target area determined by the hotspot location. In some embodiments, the display data gathered from within the target area is represented as a configuration of pins on a single tactile display having a predefined pixel-to-pin ratio. In other embodiments having several tactile displays, the target area may be the union of multiple areas each having a corresponding configuration on a different tactile display.

Figure 1:
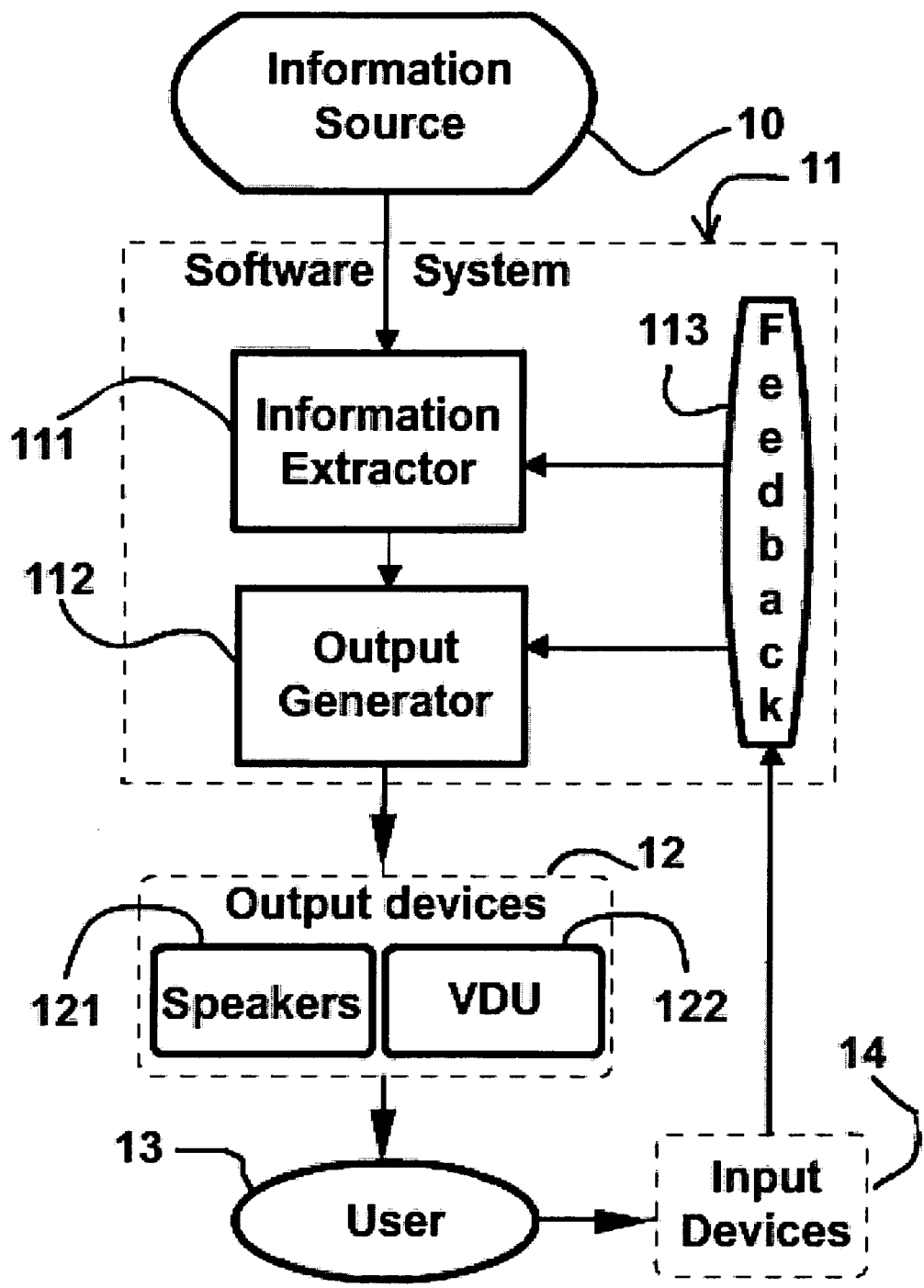
FIG. 1 is a block diagram of a PRIOR ART personal computer system.
Figure 8:
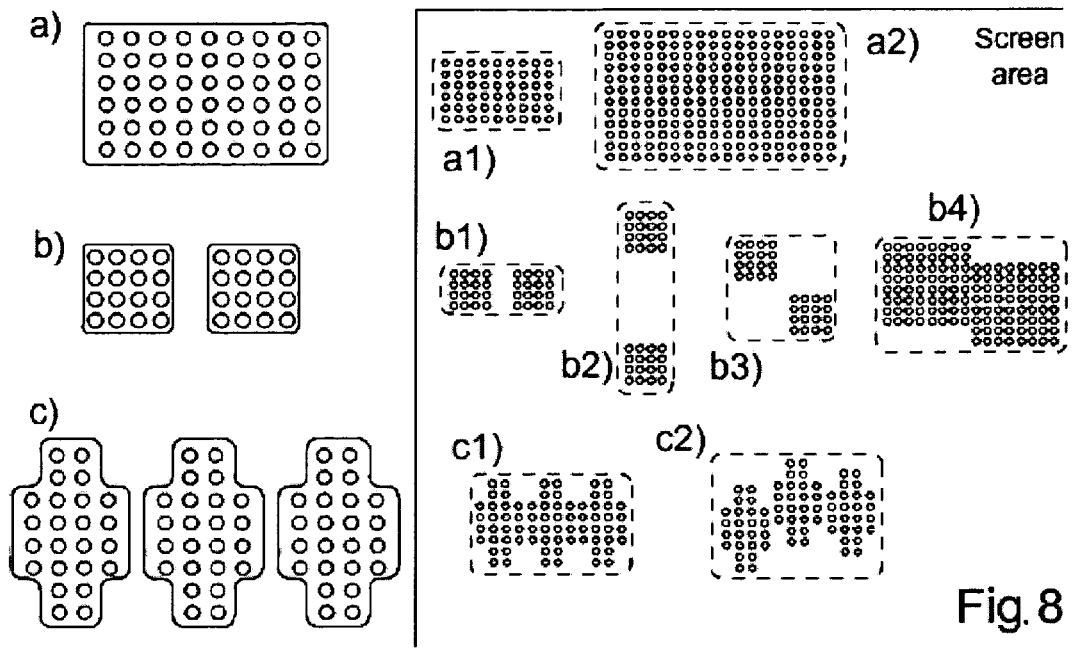

Several typical configurations are shown in FIGS. 8A, 8B and 6C. Referring now to FIG. 8A, there is shown a single tactile display which has a rectangular configuration with, for example, 54 pins arranged in a six row by nine column array. Corresponding areas of the computer screen are shown in FIGS. 8A1 and 8A2, respectively. In FIG. 8A1, the screen area displayed is seen to be an array of six by nine pixels, which is represented on the tactile display at a one to one resolution, such that a single pin represents a single pixel. In FIG. 8A2, however, the screen area displayed is seen to be a rectangular array of twelve rows by eighteen columns, which when represented by the six by nine in array seen in FIG. 8A, corresponds to a zoom out resolution of four to one. In a case such as this, the integrated color of each group of two by two pixels which is to be represented by a single pin, is represented as described above. The integrated color of the pixels is achieved by the use of any well known averaging, median, or morphological algorithm for this purpose, which are beyond the scope of the present invention and are thus not described herein, in detail.

FIG. 8B shows a two array display of pins, each array having an exemplary four rows by four columns configuration. The use of two such arrays provides multiple possibilities in terms of the screen portions that may be displayed to the user by the tactile mouse 15. Such possibilities include the two square portions of the screen which may be spaced apart horizontally as in FIG. 8B1; or vertically as in FIG. 8B2; or diagonally as in FIG. 8B3. In all of these examples, the resolution is 100%, i.e. each pixel on the screen display (FIGS. 8B1-3) is represented on tactile display by a single pin. In the example of FIG. 8B4, however, each screen display area is eight by eight pixels, and, as seen, the tactile display of FIG. 8B is at a zoomed out 4:1 resolution.

Referring now to FIG. 8C, there are shown three tactile displays, each having twenty four pins and configured to fit the finger tips of a typical user. Each of FIGS. 8C1 and 8C2 shows a union of three screen areas to be displayed on the tactile displays at one to one resolution; in the first example, seen in FIG. 8C1, the three areas are side by side on the screen display, whereas, in the example of FIG. 8C2, they are displaced relative to each other.

The above described configurations are presented for illustrative purposes only. It will be understood that all other display configurations with plurality of different correspondences between screen areas are also in scope of this application.

Referring back to FIG. 7, the Graphics Extractor 1181 transforms the data according to the user's requests and preferences to a form appropriate output to be sent to the GAI 15 (FIG. 4A). Such transformations are: image compression according to pixel-to-pin ratio, grey levels, pixel color, and so on, all as described above. All other transformation types used in image processing are also in the scope of this invention.

The text extractor 1182 is activated when the mode switch 117 is used to select the text mode. Typically, the text extractor 1182 extracts textual information such as character strings, words, sentences and the like. The output of the text extractor is generally an ASCII or Unicode character code which is passed to the Information Analyzer & Transformer 119 (FIG. 4A, FIG. 9) for processing.

It is further noted that the output of the graphics and text extractors 1181, 1182 may be transferred to a data analyzer 1184 configured to determine the nature of the visual information and optionally to send automatic commands to the mode switch 117 to switch between modes. Alternatively, the mode switch may be controlled manually by the user.

The Context Extractor 1183 is activated when the mode switch 117 selects a navigational mode such as CNM or SCNM. The context extractor 1183 extracts descriptors relating to the currently displayed GUI elements, for example titles, headers, captions, locations, dimensions and the like. This data is output to the Information Analyzer & Transformer 119 (FIG. 4A, FIG. 9) for further processing.

The Information Analyzer & Transformer

The Information Analyzer & Transformer 119 is configured to analyze the features of the information extracted by the ESI 118 and converts the information into a form required by the user and in accordance with mode of operation selected.

Figure 9:
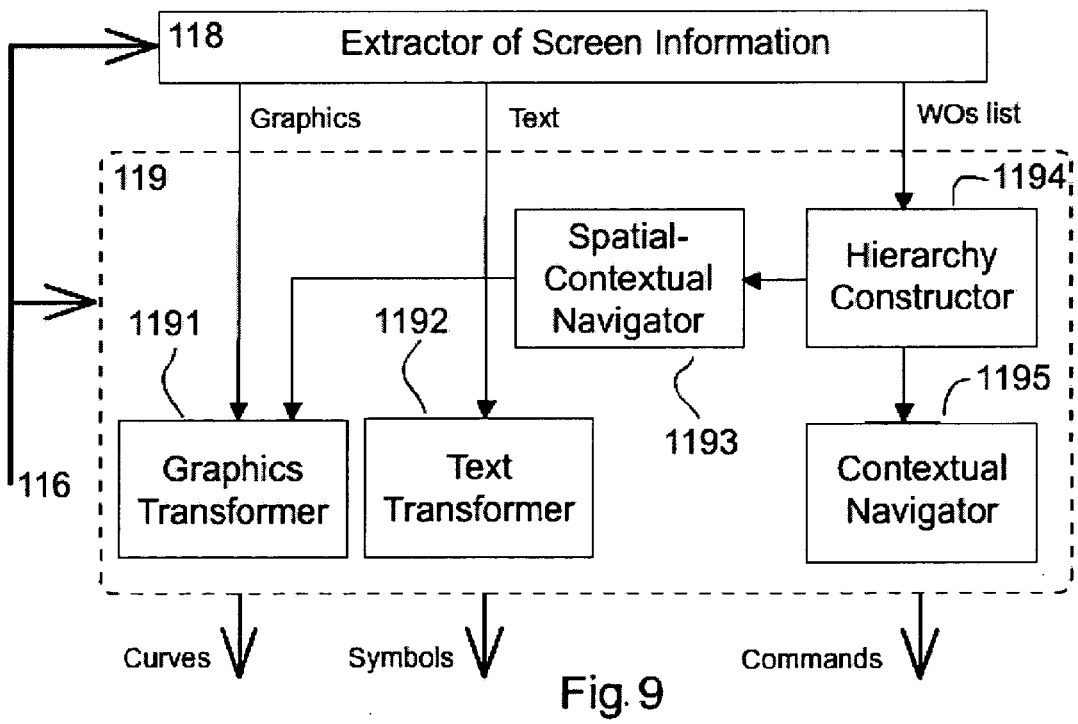
FIG. 9 is a block diagram of an information analyzer and transformer, constructed and operative in accordance with a further embodiment of the invention.

Referring now to FIG. 9, there is shown a schematic representation of the Information Analyzer & Transformer 119 in accordance with an alternative embodiment of the invention. The Information Analyzer & Transformer 119 receives extracted data from the ESI 118 and analyzes the extracted data with transformers which are configured to render the information required by the user into a form suitable for non-visual output, typically in tactile and optionally also in audio form. Furthermore, contextual data may be organized by a Hierarchy Constructor 1194 for navigation with a Contextual Navigator 1195 or a Spatial-Contextual Navigator 1193.

Graphical data from the Graphics Extractor 1182 is processed by the Graphics Transformer 1191 which outputs data representing shapes, curves and other rendered visual indications. This data is then passed to the Generator of Accessible Information 115 (FIG. 4A) for output to the tactile display 152 (FIG. 5a) of the tactile mouse 15.

Textual data from the text extractor 1182 is received by the text transformer 1192. The text transformer 1192 is configured to receive a character code such as ASCII or Unicode and to render it tactilely and/or acoustically according to user preferences and other factors such as required language, modified printed fonts, Braille code and the like. Textual data from the text transformer 1192 is passed to the Generator of Accessible Information 115 (FIG. 4A) for output to the tactile display 152 of tactile mouse 15.

Contextual information such as GE descriptors drawn from the context extractor 1183 are passed to the hierarchy constructor 1194 for organization into a hierarchical tree structure (see below). The hierarchical tree may be used for contextual navigation or in conjunction with the graphics transformer 1191 for spatial-contextual navigation.

The hierarchy constructor 1194 is configured to receive the GE parameters and to construct a hierarchy with the screen at its root. Because complex displays may involve thousands of branches of a hierarchical tree, the hierarchy constructor 1194 preferably has preconfigured filtration rules as known in the art.

Contextual Navigation Mode

Figure 10:
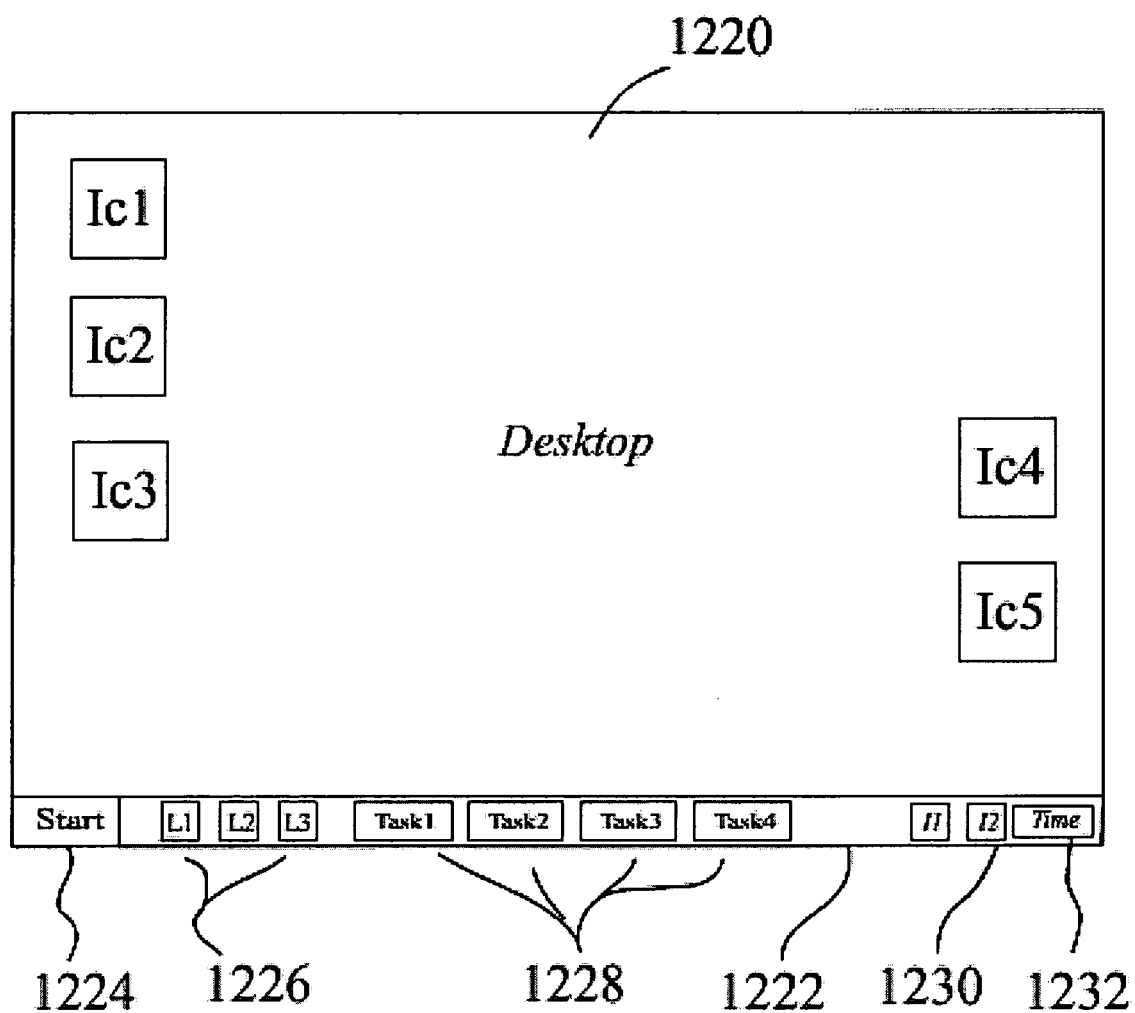
FIG. 10 is a schematic diagram of an example of a typical computer screen.

In order to better understand the contextual navigation mode (CNM), reference is made to FIG. 10 which schematically shows a typical computer screen or VDU 122 having the following GUI elements:

a desktop 1220 upon which are five icons $Ic_{1-5}$;

a program bar 1222 containing a start button 1224;

a quick launch bar 1226 having three links L1, L2 and L3;

a task bar 1228 having displayed thereon four tasks respectively shown as Tasks 1, 2, 3 and 4; and a system tray 1230 having two icons I1 and I2, and a clock 1232.

Figure 11:
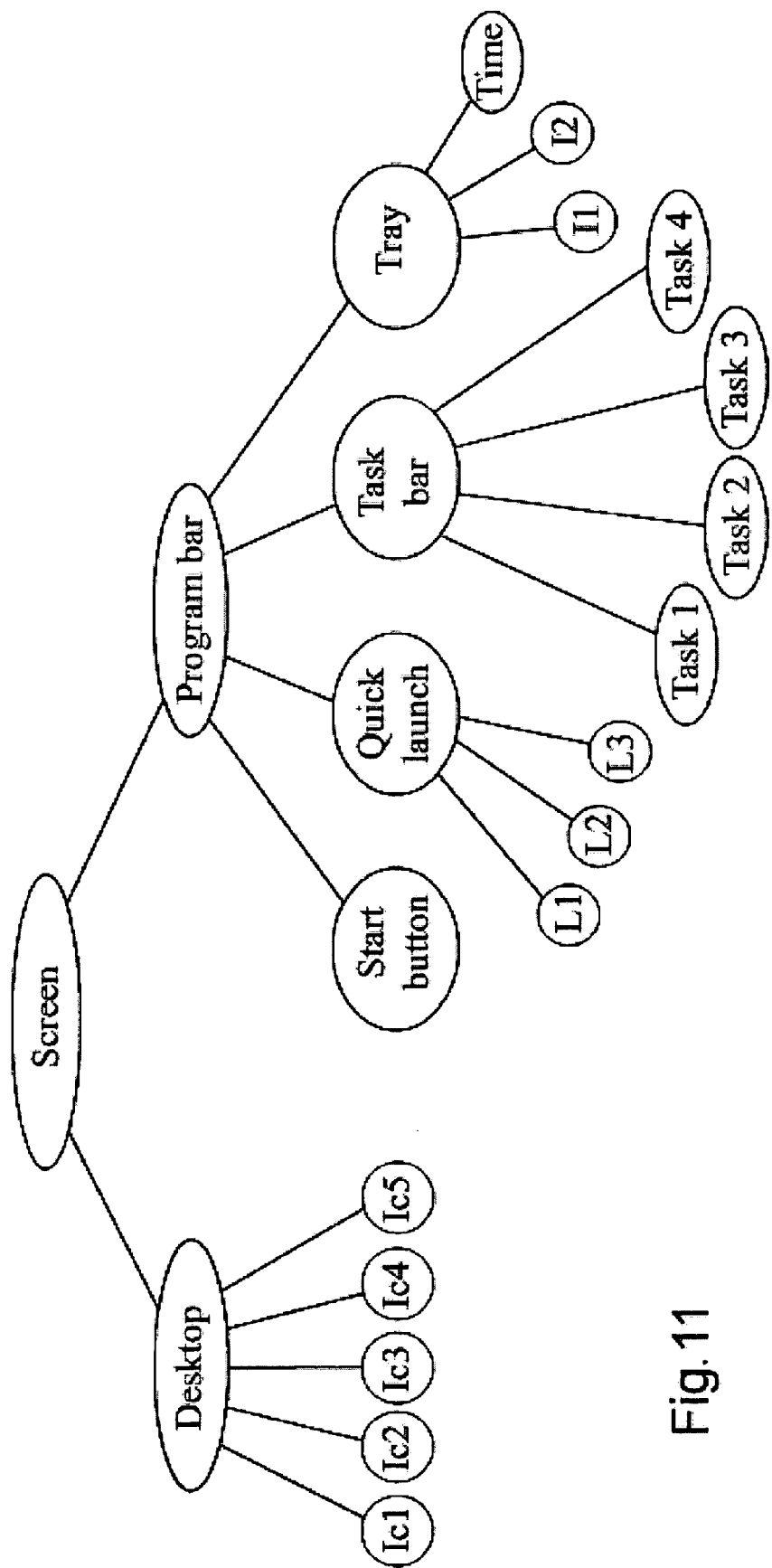
FIG. 11 shows a hierarchical arrangement of the data elements of the computer screen of FIG. 10.

FIG. 11 shows how these elements are organized into a hierarchical structure with the screen as its root.

Figure 12A:
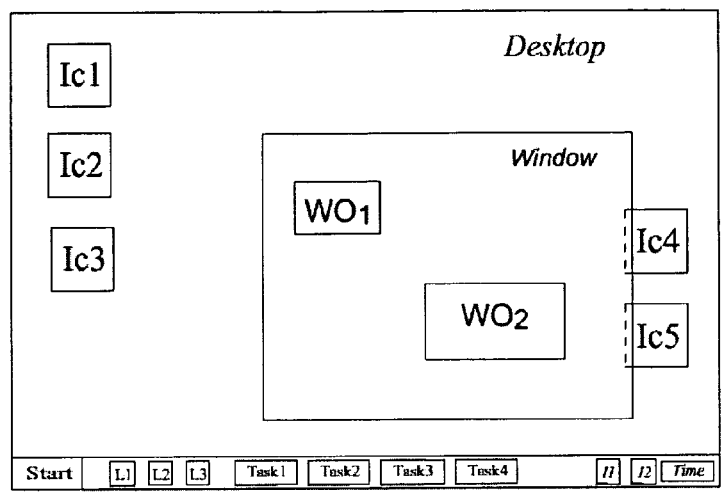
FIG. 12A is a schematic diagram of a second example of a typical computer screen.
Figure 12B:
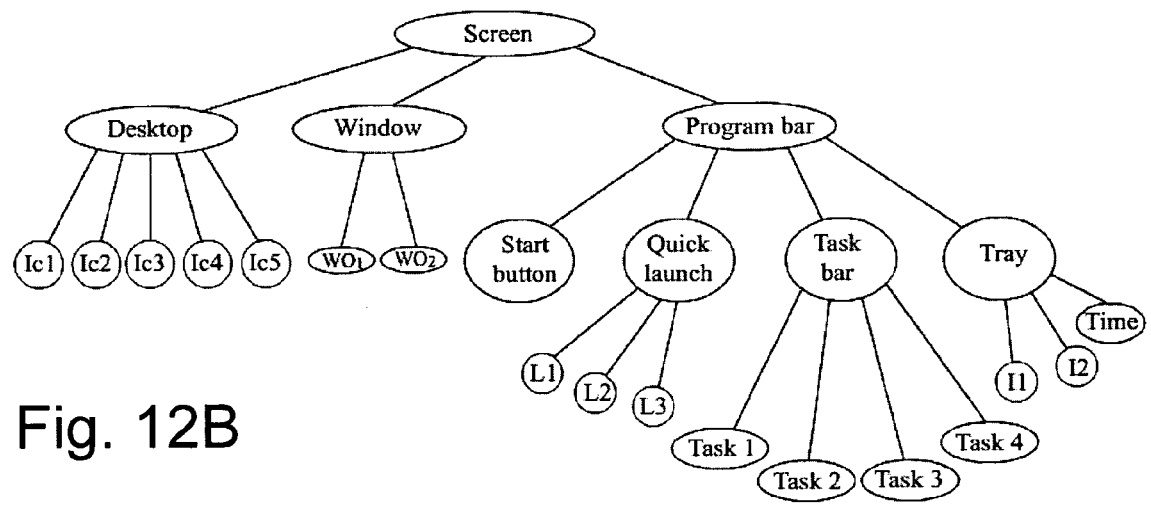
FIG. 12B is a schematic representation of the hierarchical arrangement of the contents of the screen of FIG. 12A.

FIG. 12A shows the same screen in which an application window panel is opened containing two additional GUI elements, represented as window objects $WO_1$ and $WO_2$. FIG. 12B shows the corresponding hierarchical structure which includes all the elements of FIG. 11 as well as a new branch with elements associated with the window panel.

Figure 13A:
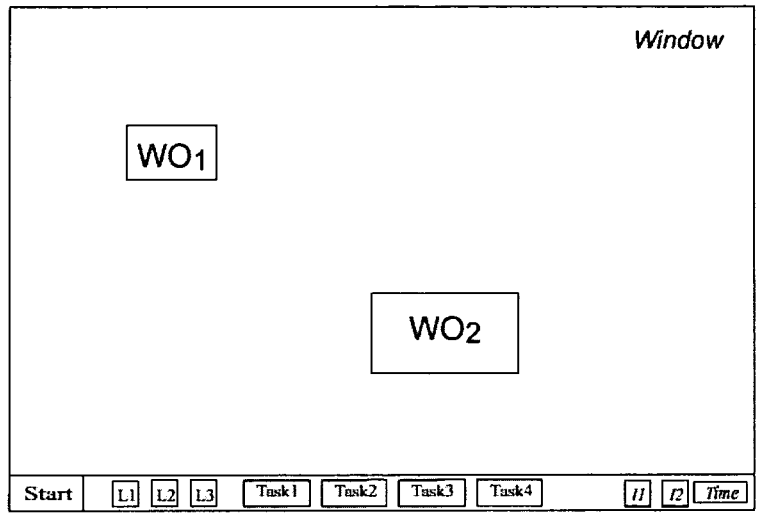
FIG. 13A is a schematic diagram of a third example of a typical computer screen.
Figure 13B:
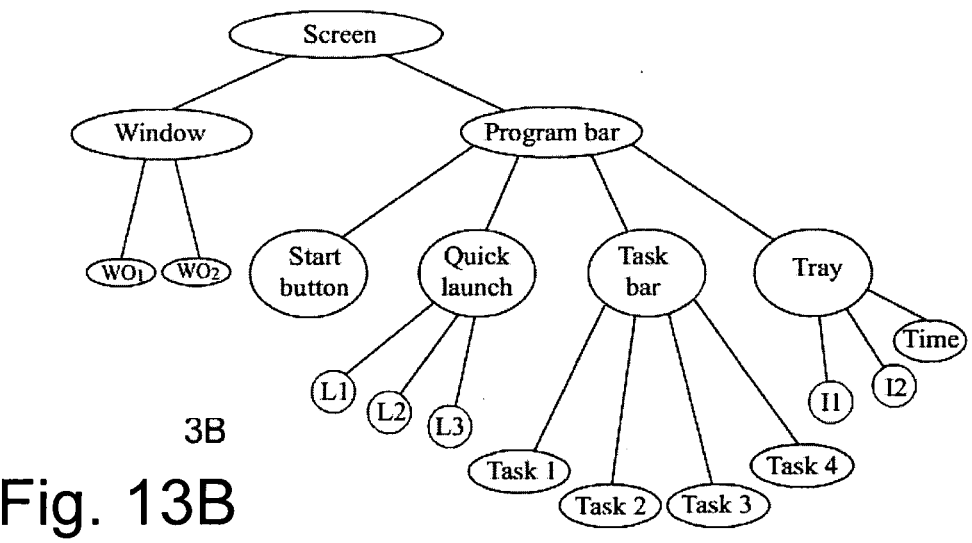
FIG. 13B is a schematic representation of the hierarchical arrangement of the contents of the screen of FIG. 13A.

FIG. 13A shows the same screen with the window panel maximized to fill the area of the desktop, in the associated hierarchy shown in FIG. 13B the desktop is no longer included corresponding to the lack of a visual representation of the desktop.

In contextual navigation mode (CNM) the tactile mouse 15 is used to move its cursor around the screen from one GUI Element to another in accordance with the corresponding hierarchical structure. The tactile mouse cursor is initially centered upon one GUI Element and is configured to respond to predetermined movements of the tactile mouse 15 by jumping to other GUI Elements. For example, as will be shown in relation to FIG. 15 below, a predetermined horizontal shift causes the tactile mouse cursor to jump to the next sibling element, whereas a predetermined vertical shift causes the tactile mouse cursor to jump to the parent element if the shift is upwards and to a child if the shift is downwards.

At each navigational jump the user receives descriptive information in non-visual form regarding the current GUI Element. The non-visual output typically includes tactile output of the tactile mouse 15 and may alternatively or additionally include audio signals, for example vocal descriptors. The user may base navigational decisions upon such non-visual feedback, for example whether to shift the tactile mouse 15 again, to click a certain tactile mouse button 153, enter a keystroke or such like.

It will be appreciated that use of the contextual navigation mode in combination with a tactile mouse 15 allows a visually impaired user to navigate efficiently around the screen in a manner similar to that of a sighted user.

Figure 14:
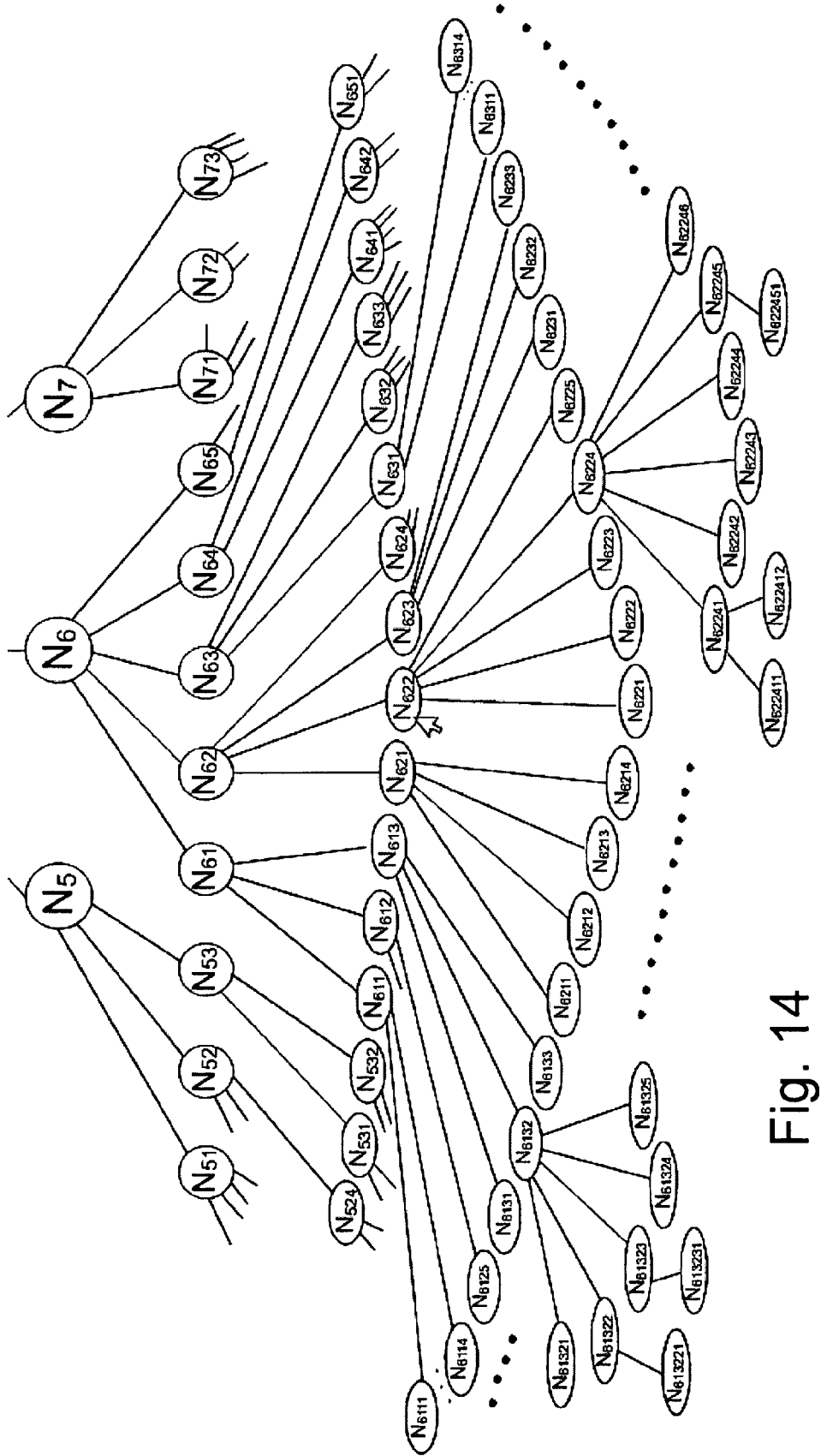
FIG. 14 shows an exemplary section of an extended hierarchical arrangement of data elements.

In order to better understand one suggested algorithm for use with the contextual navigation mode, reference is now made to FIG. 14 showing a section of a more complicated exemplary hierarchy. Such a hierarchy may be constructed by the Hierarchy Constructor 1194 (FIG. 9) and includes upper level nodes $N_x$ which have second generation child nodes $N_{xx}$ which themselves have third generation children $N_{xxx}$ and so on branching outwards.

The Contextual Navigator 1195 (FIG. 9) is configured to construct virtual tables describing the surroundings of a currently selected node. FIG. 15A shows such a virtual table positioned upon 'leading' node $N_{622}$ of FIG. 14; this means that the tactile mouse cursor is positioned over the leading GUI element (GE) denoted $N_{622}$. The virtual table contains three rows: an upper row is the parent node and always contains only one element; a middle row includes the currently selected node and its siblings and a lower row includes the children of the currently selected node.

Navigational actions allow a user to construct new virtual tables centered upon different nodes. For example, a vertical upwards shift of value $S_y$ of the tactile mouse 15 pushes the tactile mouse cursor to the center of a GE enumerated as $N_{62}$ and reconstructs a virtual table now centered upon the parent node $N_{62}$, as indicated in FIG. 15B. An opposite vertical shift of $S_y$ of the tactile mouse in a downwards direction and three horizontal shifts to the right, constructs a virtual table centered upon the default child node $N_{6224}$, as indicated in FIG. 15c and moves the tactile mouse cursor to the center of the GE labeled $N_{6224}$. Similarly, a horizontal shift $S_x$ of tactile mouse 15 constructs a virtual table centered upon an adjacent sibling node $N_{621}$ or $N_{623}$ as indicated in FIGS. 15D and 15E respectively moving the tactile mouse cursor to the correspondent GE.

It is noted that optionally, when the tactile mouse cursor points to the last sibling of a set of sibling nodes, a horizontal shift may usefully construct a virtual table centered upon the first sibling node. Alternatively, no action may be taken, if the center of the table shifts to the child nodes, for example. When a node is childless (a leaf node) a downward shift typically has no effect on the table. Usefully a corresponding indication may be provided informing the user that the node is childless, for example a special animation on the tactile display, audio signal, voice announcement or the like.

In preferred embodiments, the number of pixels that the tactile mouse cursor is shifted is used to indicate which node upon which to center the next virtual table. So for example by shifting the tactile mouse cursor horizontally say $S_x=20$ pixels the adjacent sibling node becomes the center of the next virtual table whereas a shift of $S_x=40$ pixels would jump to the next sibling. Alternatively by shifting the tactile mouse cursor vertically upwards by $S_y=20$ pixels may select the parent node as the center of the next virtual table whereas a shift of $S_x=40$ pixels would jump to the grandparent node. Other commands will occur to software designers.

As described above for successful use of the CNM the tactile mouse cursor must be shifted only horizontally and vertically. However, a computer mouse is almost never moved in a purely horizontal or vertical direction. Typically, the mouse is shifted along a curve, that is, simultaneously in both horizontal and vertical directions, at any given moment. Therefore it is necessary to define transformations useful for interpreting motion of the mouse which approximate horizontal or vertical as strictly horizontal or vertical motion of the cursor respectively.

FIG. 16A represents a possible transformation associated with shift directions. Here any movement with a slope angle within 45 degrees of vertical is considered vertical, similarly any movement with a slope angle within 45 degrees of horizontal is considered horizontal. Thus, a user tracing the curved path that is shown in FIG. 16A with the mouse, results in the cursor moving along the angular path shown in FIG. 16C. It will be appreciated that such a limitation of movement is not obligatory (but can be useful) when the system is operating in text mode, graphics mode or spatial-contextual navigation mode.

At each jump of the tactile mouse cursor, the user is presented with output information such as audio signals, tactile text symbols, tactile graphical representations, tactile animations, or the like. The user may also interface with the currently selected node using input means such as pressing/releasing tactile mouse button 152s and/or keystrokes. The input means are typically the same as those used by a sighted user when a system cursor selects a given GUI element. Therefore, for example, if the GUI element is a leaf node in a current hierarchy, such as a file in a file list of MS Windows® Explorer, double-clicking may open the file, right clicking may present a number of options such as cutting or copying the file or so on. If the GUI element is the text area of a word processor for example, left clicking may select textual input mode.

Other tactile mouse button 153 functionality may be provided such as a freeze command for freezing the position of the tactile mouse cursor so that the device can be rearranged for example. Usefully, a history of tactile mouse cursor momentary stops may be stored so that a user can easily move back along their previous path by clicking of a tactile mouse button 153.

Usefully, when exiting CNM unintentionally, the final selected GE is stored in a memory such that it is the node that is automatically selected upon reactivation of CNM. If the user switches to CNM after working with another operational mode, however, for example, from a graphic mode, the CNM starts from that GE which is currently indicated by the tactile mouse cursor.

In various embodiments of the invention, in spatial-contextual navigation mode SCNM a guiding trajectory is created from one GUI element to the next. The guiding trajectory is stored in the memory of the computer and displayed on the tactile display 152, optionally, the trajectory may be further displayed visually upon the VDU.

The guiding trajectory is provided to guide the user between GUI elements by following the tactile indication whilst moving the mouse 15. If the user loses the guide line, commands may be provided to jump the tactile mouse cursor to the target object, to the closest point upon the line or such like. Alternatively, when the SCNM is selected, virtual tables may be constructed in a way similar to CNM.

It is noted that the preferred default mode of the TCS 400 is CNM.

One drawback of the method of traveling around a hierarchical structure described above is that a user must navigate from one node to one of those which are closest to it according to the hierarchical tree: parent, one of two neighboring siblings or child. This may not be particularly inconvenient in the case of large trees where data elements contextually close to each other may be structurally distant. For example, traversing between the two nodes $N_{6132}$ and $N_{6311}$ (FIG. 14) located in different application windows in CNM involves a path with six jumps: from $N_{6132}$ to $N_{613}$ to $N_{61}$ to $N_6$ to $N_{63}$ to $N_{631}$ to $N_{6311}$. This method is very useful for beginners but may appear to be too primitive to an experienced user.

It is possible to reduce the length of many navigation paths by grousing together contextually similar GEs, for example, window panels, frames, menus, headings, links, buttons or the like. In accordance with a further embodiment of the invention, contextually similar GEs may be grouped if and only if they are located on the same structural hierarchical levels.

Figure 17:
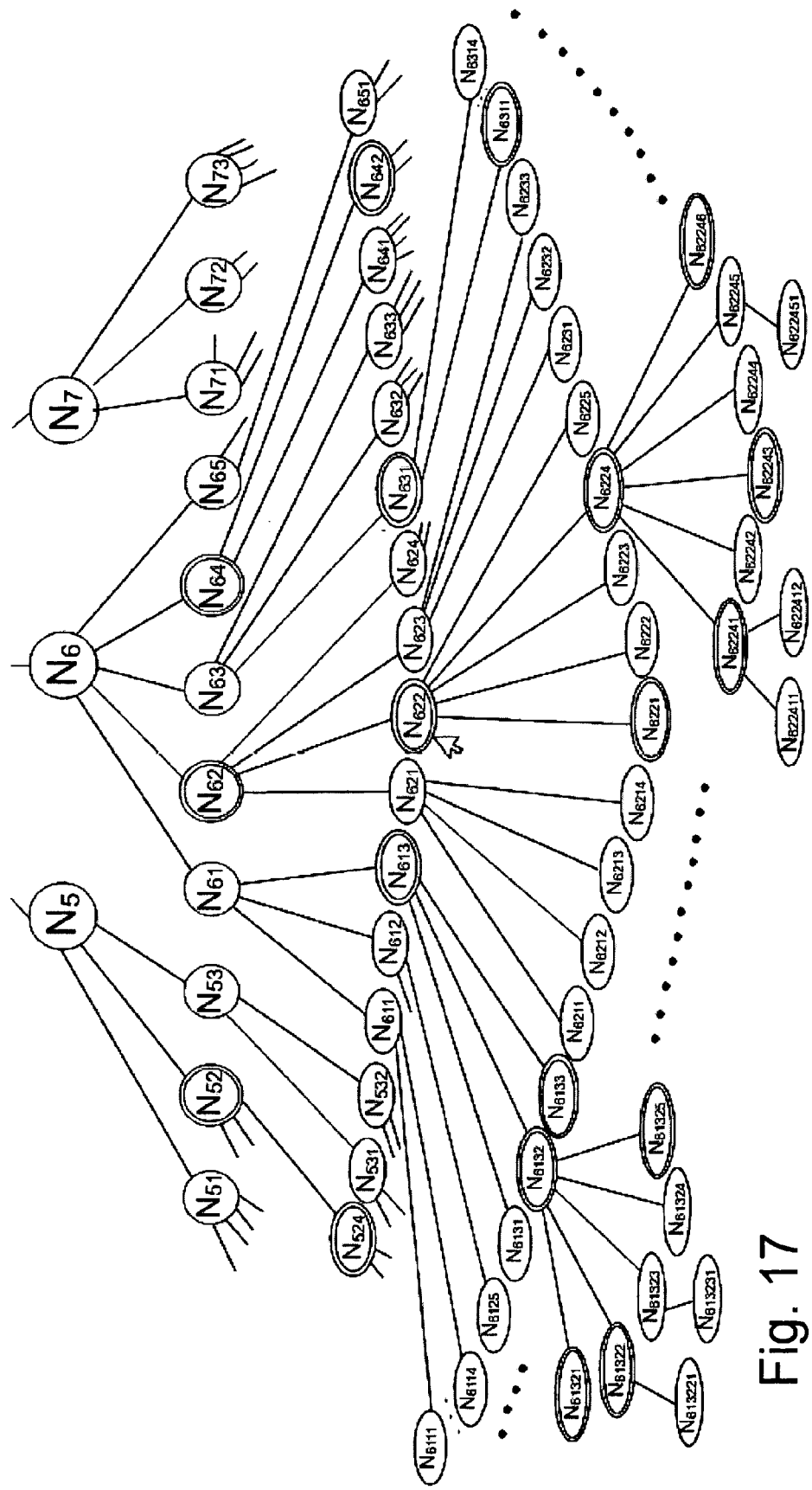
FIGS. 17 shows the section of the extended hierarchical arrangement of data elements as shown in FIG. 14 with some data elements grouped into generational sets.

Reference is now made to FIG. 17 showing the hierarchical structure shown in FIG. 14, but wherein various nodes have been grouped together, as indicated by double ring outlines. $N_{52}$, $N_{62}$ and $N_{64}$ constitute a first set, $N_{524}$, $N_{613}$, $N_{622}$, $N_{631}$ and $N_{642}$ constitute a second set and $N_{6132}$, $N_{6133}$, $N_{6221}$, $N_{6224}$ and $N_{6311}$ constitute a third set.

Figure 18:
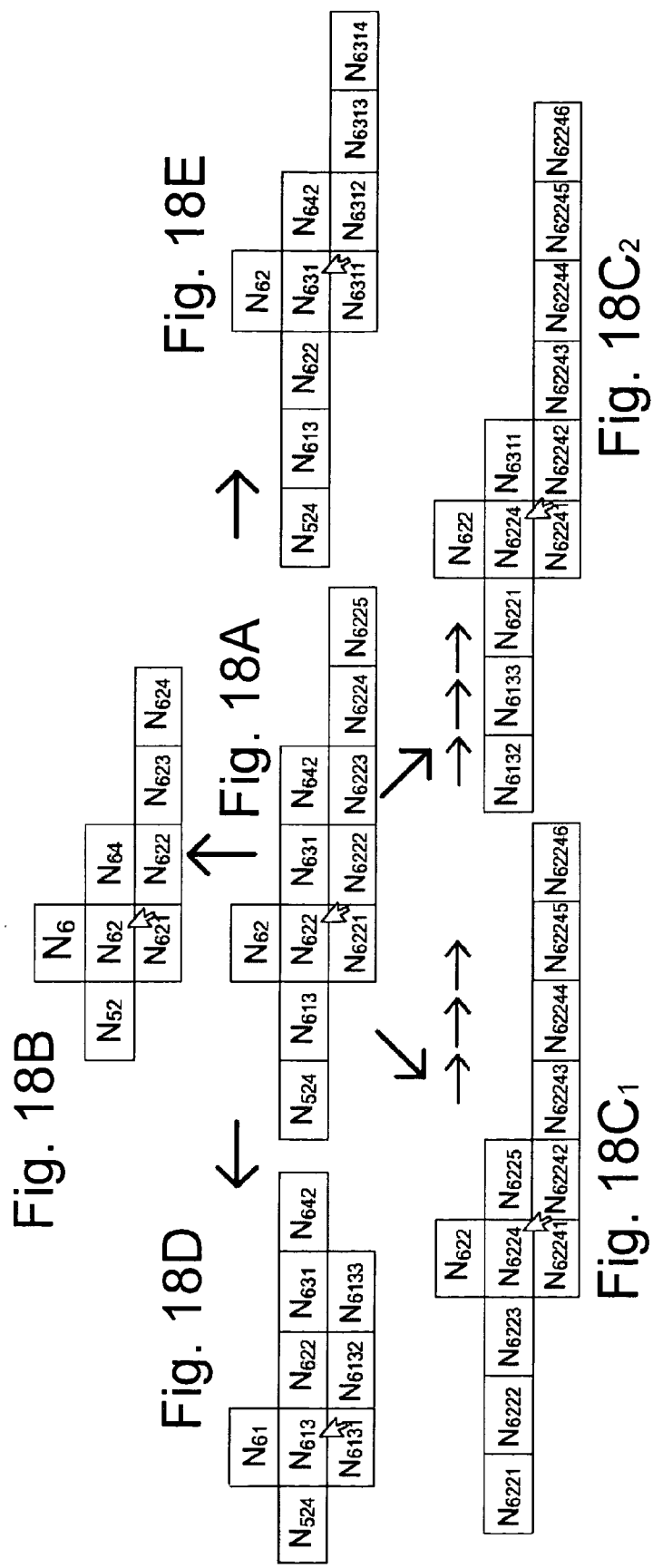
FIGS. 18A-E show a selection of virtual tables constructed for data elements of the hierarchical structure of FIG. 17 based upon the data element sets.

Referring now also to FIGS. 18A-E, there is provided a set of virtual tables similar to those in FIGS. 15A-E but for the grouped data elements, FIG. 18A shows the virtual table centered upon node $N_{622}$. In FIG. 15A, the middle row comprises the hierarchical siblings of $N_{622}$. In contrast thereto, in the virtual table of FIG. 18A the middle row contains the all the data elements in the same set as $N_{622}$. In this case, a horizontal shift $S_x$ of the cursor of tactile mouse 15 may reconstruct a virtual table centered upon an adjacent node of the same set $N_{613}$ or $N_{631}$ as indicated in FIGS. 18D and 18E respectively. An upwards vertical shift $S_y$ will reconstruct a virtual table centered upon the parent node $N_{62}$, as indicated in FIG. 18B.

As illustrated in FIGS. 18C1 and 18C2, there are two alternative responses to a shift downwards and three horizontal shifts to the right.

FIG. 18C1 shows a first virtual table centered upon $N_{6224}$ in which the middle row includes all the child elements of $N_{622}$.

Alternatively, a second virtual table centered upon $N_{6224}$ is shown in FIG. 18C2, in which the middle row contains all the members of the same set as $N_{6224}$, rather than its sibling elements. Various commands can be used for differentiating between such shifts as will occur to software developers.

Note that using the grouped structure of FIGS. 17 and 18A-E, the new path from $N_{6132}$ and $N_{6131}$ involves a path with only four jumps: from $N_{6132}$ to $N_{613}$ to $N_{622}$ to $N_{631}$ to $N_{6311}$.

Further improvement of the navigation method so as to reduce the number of navigational steps, may be achieved by a further approach in which GEs are grouped together based on context only, regardless as to whether they are on the same hierarchical level. As opposed to the previous manner described above in conjunction with FIGS. 17 and 18A-E, in which contextually similar GEs are grouped together on the same hierarchical levels, the second type obviates this requirement.

Figure 19:
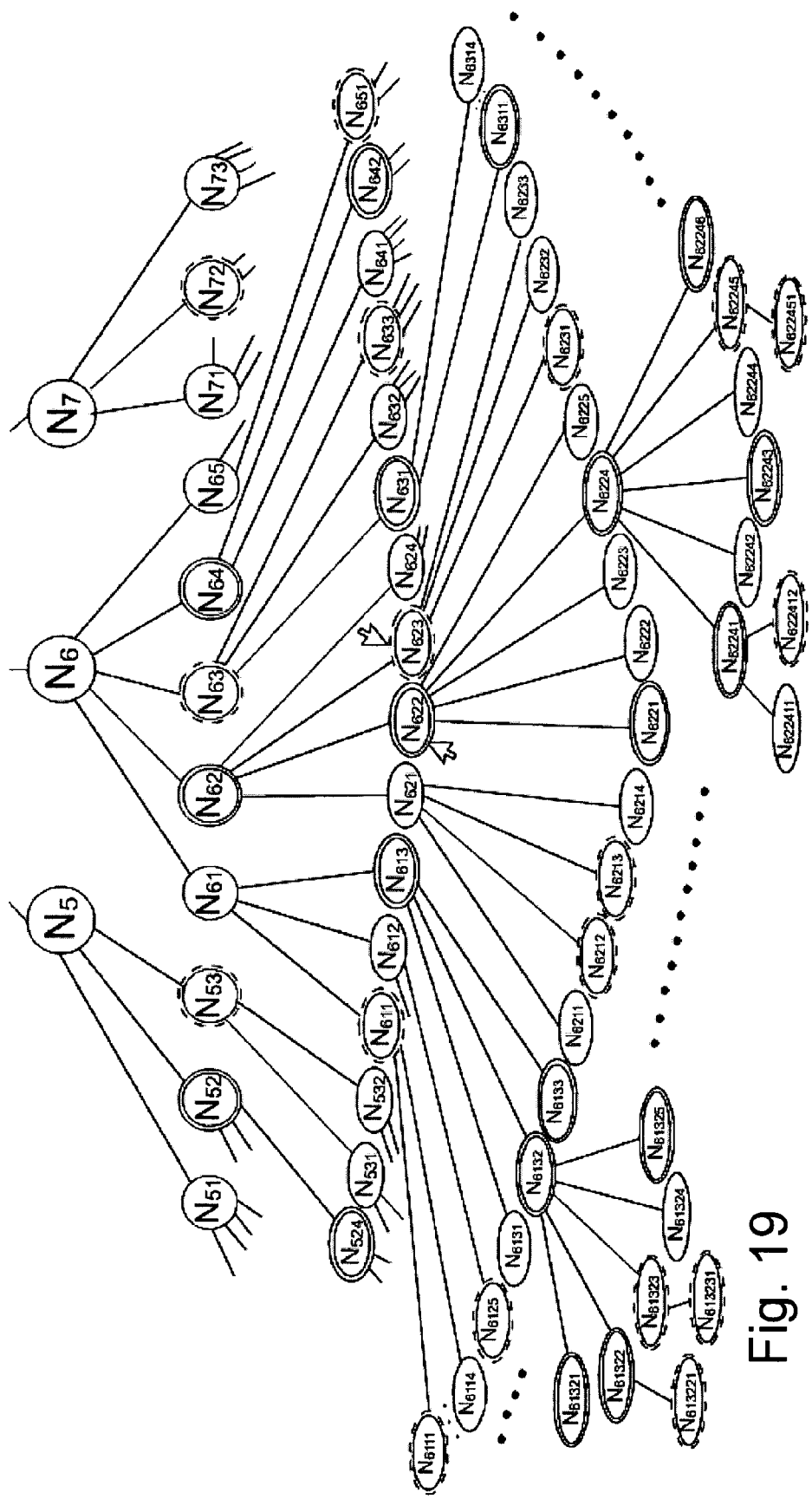
FIG. 19 again shows the section of the extended hierarchical arrangement of data elements as shown in FIGS. 14 and 17 with two groups of data elements grouped into cross-generational sets.

The present approach is described, also with reference to the exemplary hierarchy illustrated in FIGS. 14 and 17, which is again denoted in FIG. 19. Two sets or groups of GUI elements, for example:

a set of all push buttons currently presented on the screen which are indicated by double rings in FIG. 19, and a set of all WEB links, indicated by dashed outer rings in FIG. 19.

It will be noted that the sets here are cross generational.

Figure 20:
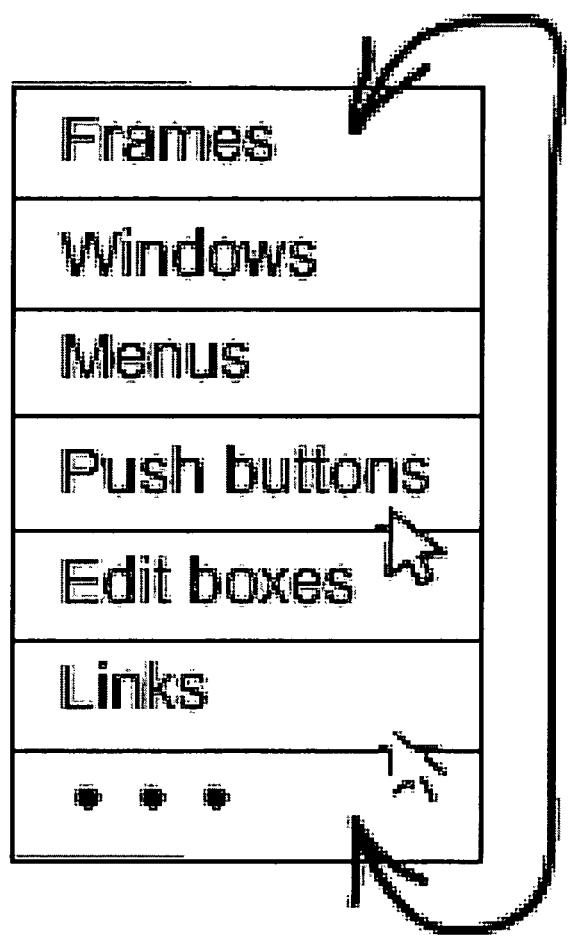
FIG. 20 represents a set catalogue which a user might use to select a navigational group.

In preferred embodiments of the invention, a catalogue of such groups may be provided for a user to select a set of elements to use as a base for navigation. An example of such a catalogue is shown in FIG. 20 in which the set of push buttons corresponds to the set of double ringed elements in FIG. 19 and the set of links corresponds to the set of dashed elements in FIG. 19. The selection of a required set from the catalogue may be achieved by a vertical motion of the cursor of the tactile mouse 15 and by clicking button 153 of tactile mouse 15.

Figure 21B:
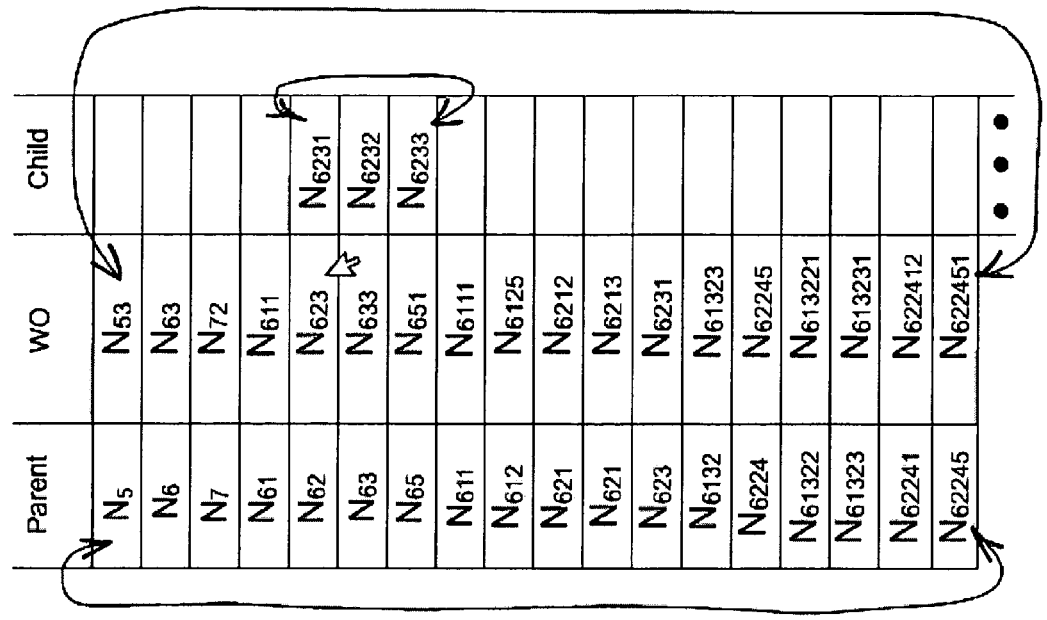
FIGS. 21A and 21B represent virtual tables constructed for data elements centered on each of the two sets indicated in FIG. 19.
Figure 21A:
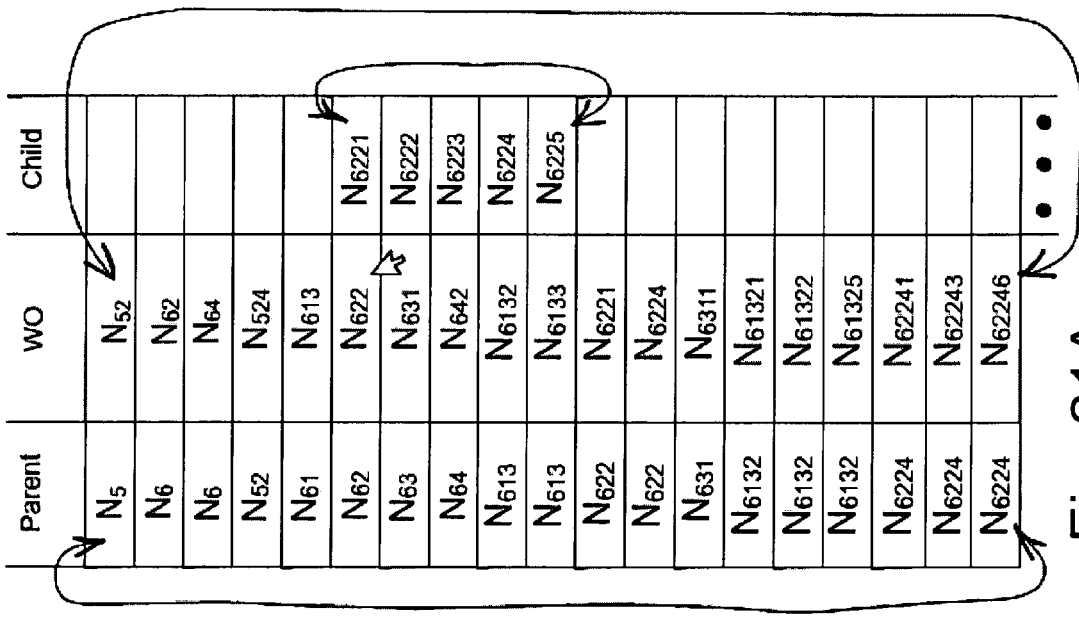

By way of explanation, and referring now also to FIGS. 21A and 21B, in one embodiment, suppose there is selected a first set of elements, having the element $N_{622}$ as the leading GE. By clicking a button 153 of the mouse, to select the CNM the virtual table shown in FIG. 21A is constructed. The table is oriented vertically in the figure for convenience.

The second or middle column in the table of FIG. 21A contains all the GUI elements of the first set including $N_{622}$. The first or left column contains all the parents of the elements in the second column, and the third or right column contains all the child data elements of leading object $N_{622}$. All three columns in this example are cyclical meaning that when a user scrolls through the list after reaching the last element the list returns to the first element. A second virtual table corresponding to the second data set is presented in FIG. 21B.

It will be appreciated that apart from the above described structures, data elements may be alternatively arranged according to other logical structures as required.

In the claims, the word "comprise", and variations thereof such as "comprises", "comprising" and the like indicate that the components listed are included, but not generally to the exclusion of other components.

It will be appreciated by persons skilled in the art that the present invention is not limited to what has been specifically shown and described hereinabove. Rather, the scope of the present invention is limited solely by the claims, which follow.

The invention claimed is:

1. A tactile access and navigation system for a visually impaired user operating within a computerized data environment, said system comprising:
   a. a tactile mouse having at least one tactile display and at least one user-operable input control;
   b. data extraction, analysis and transformation software in communication with said at least one tactile display, operative to extract and analyze display data from the computer, and to transform extracted display data into a form suitable for display by said at least one tactile display;
   c. means for rearranging GUI elements selected from among the display data into a new hierarchical structure having at least two hierarchical levels, said new hierarchical structure being navigable by jumping from an element in one hierarchical level to an element in a different hierarchical level without regard to their location within the display data by predetermined directional inputs to said tactile mouse; and
   d. means for providing data to said at least one tactile display in accordance with predetermined modes of operation, which include:
      i. a viewing mode for displaying on said at least one tactile display a tactile representation of graphical and textual data content; and
      ii. a navigational mode for displaying on said at least one tactile display a tactile representation of the relative positioning of said GUI elements within said structure, wherein said navigational mode is selected by the user from the group comprising:
         a. a spatial navigation mode wherein the user is enabled to freely move a fiducial element along a desired path;
         b. a contextual navigation mode wherein the user is enabled to jump a fiducial element to a new location in response to a predetermined user input via said tactile mouse; and
         c. a spatial-contextual navigation mode wherein the user is guided to move a fiducial element along a virtual guide trajectory by use of said tactile mouse.

2. A method of navigating among GUI elements represented in display data extracted from a computer memory, employing a tactile mouse having at least one tactile display and at least one command input control, said method comprising:
   a. extracting display data from among the GUI elements displayed on the computer screen;
   b. identifying the GUI elements among the extracted display data;
   c. reorganizing the GUI elements into a new logical hierarchical structure of GUI elements, said new hierarchical structure having at least two hierarchical levels and being navigable by predetermined directional inputs to the tactile mouse;
   d. displaying in tactile form upon a tactile display descriptors relating to a first GUI element in said new hierarchical structure;
   e. sensing input from the tactile mouse, said input including spatial motion of the tactile mouse, and input of commands via the at least one input control;
   f. in response to said input from the tactile mouse, selecting a second GUI element from said new hierarchical structure in accordance with a navigational mode selected by a user from among a plurality of predetermined different navigational modes; and
   g. indicating the selected second GUI element to the user.

3. The method of claim 2 wherein step (g) of indicating the selected second GUI element to the user comprises constructing a virtual tactile guide line extending from the first GUI element to the second GUI element in spatial navigation mode, indicating a direct route to be taken by the tactile mouse from the first GUI element to the second GUI element.

4. The method of claim 2 wherein step (g) of indicating the selected second GUI element to the user comprises displaying in tactile form upon said tactile display descriptors relating to the second GUI element.

5. The method of claim 2, wherein a selection of said GUI elements is grouped into at least one set wherein step (f) of selecting a second GUI element comprises constructing a virtual table having a top row, a bottom row, and a middle row therebetween, wherein
   said middle row contains a plurality of GUI elements including the first selected GUI element,
   said top row contains the parent of said first selected GUI element, and
   said bottom row contains all the children of said first selected GUI element;
   and wherein each of said GUI elements from said top, middle and bottom rows are selectable as said second GUI element.

6. The method of claim 5, wherein said at least one set of GUI elements contains all the siblings of the said first selected GUI element.

7. The method of claim 5, wherein said at least one set of GUI elements contains GUI elements having a context close to that of said first selected GUI element and on the same hierarchical level thereas.

8. The method of claim 2, wherein a selection of said GUI elements is grouped into at least one set wherein step (f) of selecting a second GUI element comprises constructing a virtual table having a top row, a bottom row, and a middle row therebetween,
   wherein said middle row contains GUI elements having a context close to that of said first selected GUI element in said hierarchical structure independently of the respective hierarchical levels of said GUI elements in said middle row,
   wherein said top row contains the same number of GUI elements as the said middle row and each of them is the parent of a corresponding GUI element in said middle row, and said bottom row contains all the children of said first selected GUI element, and
   wherein each of said GUI elements from the top, middle and bottom rows is selectable as said second GUI element.

9. The method of claim 2, wherein said navigational mode is selected from one of plural possible navigational modes including:
  a. a spatial navigation mode wherein the user is enabled to freely move a fiducial element along a desired path;
  b. a contextual navigation mode wherein the user is enabled to jump a fiducial element to a new location in response to a predetermined user input; and
  c. a spatial-contextual navigation mode wherein the user is guided to move a fiducial element along a virtual guide trajectory.

10. A tactile computer interface comprising:
a tactile mouse having at least one tactile display and at least one command input control; and
a software system of executable computer program code which, when executed by at least one processor in communication with computer display data and said tactile mouse, is configured to provide a tactile control interface having a selectable navigation mode enabling a blind user to navigate between graphical user interface (GUI) objects represented by said computer display data, said software system comprising:
extraction, analysis and transformation code configured to extract, analyze and transform said display data into a new hierarchical structure of GUI-related data elements representing the structure of GUI-related elements therewithin;
tactile viewing code configured to display at least one of said GUI-related structural data elements on said tactile display as part of said new hierarchical structure; and
navigation code configured to permit efficient selection of a different GUI-related element within said GUI structural data elements of said new hierarchical structure by selecting one of plural predetermined navigational modes for assisting movements of the tactile mouse in relative directions within said new hierarchical structure to select a desired different GUI-related element, said navigation modes including:
  a. a spatial navigation mode wherein movements from one GUI object to another are directly controlled by spatial movements of the tactile mouse wherein the user is enabled to freely move a fiducial element along a desired path;
  b. a contextual navigation mode wherein movements from one GUI object to another are controlled based upon contextual descriptors of a target GUI object wherein the user is enabled to jump a fiducial element to a new location in response to a predetermined user input; and
  c. a spatial-contextual navigation mode wherein a virtual guide trajectory is created in computer memory between displayed GUI objects and wherein said virtual guide trajectory is employed to aid user-controlled spatial movements of the tactile mouse wherein the user is guided to move a fiducial element along the virtual guide trajectory.

11. The tactile computer interface of claim 10, wherein:
said navigation code is configured to permit efficient jump-selection of a different GUI-related element within said new hierarchical structural data elements by separated incremental movements of the tactile mouse in one or more relative directions corresponding to said new hierarchical structure to effect a respectively corresponding jump to a desired different GUI-related element.

* * * * *